(12) United States Patent
Macready

(10) Patent No.: US 7,877,333 B2
(45) Date of Patent: Jan. 25, 2011

(54) METHOD AND SYSTEM FOR SOLVING INTEGER PROGRAMMING AND DISCRETE OPTIMIZATION PROBLEMS USING ANALOG PROCESSORS

(75) Inventor: William Macready, West Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 746 days.

(21) Appl. No.: 11/850,437

(22) Filed: Sep. 5, 2007

(65) Prior Publication Data

US 2008/0065573 A1 Mar. 13, 2008

Related U.S. Application Data

(60) Provisional application No. 60/824,761, filed on Sep. 6, 2006.

(51) Int. Cl.
*G06E 1/00* (2006.01)
*G06E 3/00* (2006.01)
*G06F 15/00* (2006.01)
*G06F 9/44* (2006.01)
*G06G 7/00* (2006.01)
*G06N 99/00* (2010.01)
*G06N 7/02* (2010.01)
*G06N 7/06* (2010.01)

(52) U.S. Cl. .......................................... 706/10; 706/52
(58) Field of Classification Search .................... 706/10, 706/14, 46, 52; 977/933
See application file for complete search history.

(56) References Cited

U.S. PATENT DOCUMENTS

| | | | | |
|---|---|---|---|---|
| 6,838,694 | B2 | 1/2005 | Esteve et al. | 257/34 |
| 7,135,701 | B2 | 11/2006 | Amin et al. | 257/31 |
| 7,230,266 | B2 | 6/2007 | Hilton et al. | 257/31 |
| 7,253,654 | B2 | 8/2007 | Amin | 326/3 |
| 2001/0032694 | A1* | 10/2001 | Ishiyama | 156/110.1 |
| 2004/0167753 | A1 | 8/2004 | Downs et al. | 703/2 |
| 2005/0082519 | A1 | 4/2005 | Amin et al. | 257/13 |
| 2005/0137959 | A1* | 6/2005 | Yan et al. | 705/37 |
| 2005/0162302 | A1 | 7/2005 | Omelyanchouk et al. | 341/200 |

(Continued)

FOREIGN PATENT DOCUMENTS

EP 1647924 A2 * 4/2006

OTHER PUBLICATIONS

Farhi et al., "Quantum Adiabatic Evolution Algorithms versus Simulated Annealing," MIT-CTP #3228, arXiv:quant-ph/0201031 v1, pp. 1-16, Jan. 8, 2002.*

(Continued)

*Primary Examiner*—Donald Sparks
*Assistant Examiner*—Benjamin Buss
(74) *Attorney, Agent, or Firm*—Seed IP Law Group PLLC

(57) ABSTRACT

Discrete optimization problem are solved using an analog optimization device such as a quantum processor. Problems are solved using an objective function and at least one constraint corresponding to the discrete optimization problems. The objective function is converted into a first set of inputs and the at least one constraint is converted into a second set of inputs for the analog optimization device. A third set of inputs is generated which are indicative of at least one penalty coefficient. A final state of the analog optimization device corresponds to at least a portion of the solution to the discrete optimization problem.

19 Claims, 11 Drawing Sheets

U.S. PATENT DOCUMENTS

| | | | |
|---|---|---|---|
| 2005/0224784 A1 | 10/2005 | Amin et al. | 257/14 |
| 2005/0250651 A1 | 11/2005 | Amin et al. | 505/846 |
| 2005/0256007 A1 | 11/2005 | Amin et al. | 505/170 |
| 2005/0273306 A1 | 12/2005 | Hilton et al. | 703/11 |
| 2006/0097747 A1 | 5/2006 | Amin | 326/6 |
| 2006/0147154 A1 | 7/2006 | Thom et al. | 385/37 |
| 2006/0225165 A1 | 10/2006 | Maassen van den Brink et al. | 977/933 |
| 2006/0248618 A1 | 11/2006 | Berkley | 977/700 |

OTHER PUBLICATIONS

Knysh et al., "Adiabatic Quantum Computing in Systems with Constant Inter-Qubit Couplings," arXiv.org, arxiv:quant-ph/0511131, pp. 1-10, Nov. 15, 2005.*

U.S. Appl. No. 11/765,361, filed Jun. 19, 2007, Macready et al.
U.S. Appl. No. 60/975,083, filed Sep. 25, 2007, Amin.
U.S. Appl. No. 11/932,248, filed Oct. 31, 2007, Coury et al.
U.S. Appl. No. 11/932,261, filed Oct. 31, 2007, Macready et al.
U.S. Appl. No. 12/017,995, filed Jan. 22, 2008, Harris.
U.S. Appl. No. 12/111,818, filed Apr. 29, 2008, Fan Tang et al.
U.S. Appl. No. 12/113,753, filed May 1, 2008, Johnson et al.

"A High-Level Look at Optimization: Past, Present and Future," e-Optimization.Community, May 2000, pp. 1-5.

Aji et al., "The Generalized Distributive Law and Free Energy Minimization," 10 pages, Proc. 39th Allerton Conf. Communications, Control, and Computing, 2001.

Allen et al., "Blue Gene: A vision for protein science using a petaflop supercomputer," *IBM Systems Journal 40*(2): 310-327, 2001.

Blatter et al., "Design Aspects of Superconducting-phase Quantum Bits," *Physical Review B 63*(174511):1-9, 2001.

Boros et al., "Pseudo-Boolean Optimization," *Rutcor Research Report*, Rutgers University, pp. 1-84, Sep. 2001.

Boyer et al., "On the Cutting Edge: Simplified $O(n)$ Planarity by Edge Addition," *Journal of Graph Algorithms and Applications 8*(3):241-273, 2004.

Cadoli et al., "Combining Relational Algebra, SQL, Constraint Modelling and Local Search," arXiv:cs/0601043v1 [cs.AI], pp. 1-30, Jan. 11, 2006.

Chinneck, "Finding a Useful Subset of Constraints for Analysis in an Infeasible Linear Program," *INFORMS Journal on Computing 9*(2): 164-174, Spring 1997.

Dolan et al., "Optimization on the NEOS Server," *SIAM News 35*(6): 1-5, Jul./Aug. 2002.

Feynman, "Simulating Physics with Computers," *International Journal of Theoretical Physics 21*(6/7): 467-488, 1982.

Fourer et al., "Optimization as an Internet Resource," *INTERFACES 31*(2): 130-150, Mar.-Apr. 2001.

Friedman et al., "Quantum superposition of distinct macroscopic states," *Nature 406*: 43-46, Jul. 6, 2000.

Gutwenger et al., "Graph Drawing Algorithm Engineering with AGD," in Diehl (ed.), *Lecture Notes in Computer Science 2269. Revised Lectures on Software Visualization, International Seminar*, Springer-Verlag, London, 2001, pp. 307-323.

Heckmann et al., "Optimal Embedding of Complete Binary Trees into Lines and Grids," in Schmidt and Berghammer (eds.), *Lecture Notes in Computer Science 570. Proceedings of the 17$^{th}$ International Workshop*, Springer-Verlag, London 1991, pp. 25-35.

Il'ichev et al., "Continuous Monitoring of Rabi Oscillations in a Josephson Flux Qubit," *Physical Review Letters 91*(9): 097906-1-097906-4, week ending Aug. 29, 2003.

Knysh et al., "Adiabatic Quantum Computing in Systems with Constant Inter-Qubit Couplings," arXiv.org, URL=http://arxiv:quant-ph/0511131, pp. 1-10, Nov. 15, 2005.

Kochenberger et al., "A unified modeling and solution framework for combinatorial optimization problems," *OR Spectrum 26*: 237-250, 2004.

Landauer, "Hybrid Digital/Analog Computer Systems," *Computer*, pp. 15-24, Jul. 1976.

Makhlin et al., "Quantum-state engineering with Josephson-junction devices," *Reviews of Modern Physics 73*(2): 357-400, Apr. 2001.

Mitchell et al., "Model Expansion as a Framework for Modelling and Solving Search Problems," SFU Computing Science Technical Report TR 2006-24, pp. 1-42, 2006.

Mooij et al., "Josephson Persistent-Current Qubit," *Science 285*: 1036-1039, Aug. 13, 1999.

Mutzel, "Optimization in Graph Drawing," in Pardalos and Resende (eds.), *Handbook of Applied Optimization*, Oxford University Press, New York, 2002, pp. 967-977.

Nielsen et al., *Quantum Computation and Quantum Information*, Cambridge University Press, Cambridge, 2000, "7.8 Other implementation schemes," pp. 343-345.

Orlando et al., "Superconducting Persistent-current Qubit," *Physical Review B 60*(22):398-413, Dec. 1, 1999.

Rosenberg, "Reduction of bivalent maximization to the quadratic case," *Cahier du Centre d'Etudes de Recherche Operationelle 17*: 71-74, 1975.

Rubin et al., "Hybrid Computation 1976 and Its Future," *Computer*, pp. 37-46, Jul. 1976.

Shields, Jr. et al., "Area Efficient Layouts of Binary Trees on One, Two Layers," Parallel and Distributed Computing and Systems, Anaheim, California, 2001.

Shirts et al., "Computing: Screen Savers of the World Unite!," *Science Online 290*(5498): 1903-1904, Dec. 8, 2000.

Shor, "Introduction to Quantum Algorithms," AT&T Labs—Research, arXiv:quant-ph/0005003 v2, pp. 1-17, Jul. 6, 2001.

Wah et al., "The Theory of Discrete Lagrange Multipliers for Nonlinear Discrete Optimization," J. Jaffar (Ed.): CP'99, *LNCS 1713*: 28-42, 1999.

Wu, "The Theory and Applications of Discrete Constrained Optimization Using Lagrange Multipliers," Thesis submitted in the Graduate College of the University of Illinois at Urbana-Champaign, pp. iii-203, 2000.

* cited by examiner

US 7,877,333 B2

METHOD AND SYSTEM FOR SOLVING INTEGER PROGRAMMING AND DISCRETE OPTIMIZATION PROBLEMS USING ANALOG PROCESSORS

CROSS-REFERENCE TO RELATED APPLICATION

This application claims benefit, under 35 U.S.C. §119(e), of U.S. Provisional Patent Application No. 60/824,761, filed Sep. 6, 2006, which is incorporated herein, by reference, in its entirety.

BACKGROUND OF THE INVENTION

1. Field of the Invention

The present disclosure is directed to analog computing and, more particularly, to solving integer programming and discrete optimization problems using analog processors.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Stimulated Annealing" arXiv.org:quant-ph/0201031 (2002), pp 1-24.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are in some respects similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Patent Application No. 2005-0082519.

Computational Complexity Theory

In computer science, computational complexity theory is the branch of the theory of computation that studies the resources, or cost, of the computation required to solve a given computational problem. This cost is usually measured in terms of abstract parameters such as time and space, called computational resources. Time represents the number of steps required to solve a problem and space represents the quantity of information storage required or how much memory is required.

Computational complexity theory classifies computational problems into complexity classes. The number of complexity classes is ever changing, as new ones are defined and existing ones merge through the contributions of computer scientists. The complexity classes of decision problems include:

1. P—The complexity class containing decision problems that can be solved by a deterministic UTM using a polynomial amount of computation time;

2. NP ("Non-deterministic Polynomial time")—The set of decision problems solvable in polynomial time on a non-deterministic UTM. Equivalently, it is the set of problems that can be "verified" by a deterministic UTM in polynomial time;

3. NP-hard (Nondeterministic Polynomial-time hard)—A problem H is in the class NP-hard if and only if there is an NP-complete problem L that is polynomial time Turing-reducible to H. That is to say, L can be solved in polynomial time by an oracle machine with an oracle for H;

4. NP-complete—A decision problem C is NP-complete if it is complete for NP, meaning that:
   (a) it is in NP and
   (b) it is NP-hard, i.e., every other problem in NP is reducible to it. "Reducible" means that for every problem L, there is a polynomial-time many-one reduction, a deterministic algorithm which transforms instances I∈L into instances c∈C, such that the answer to c is YES if and only if the answer to I is YES. To prove that an NP problem A is in fact an NP-complete problem it is sufficient to show that an already known NP-complete problem reduces to A.

Decision problems have binary outcomes. Problems in NP are computation problems for which there exists a polynomial time verification. That is, it takes no more than polynomial time (class P) in the size of the problem to verify a potential solution. It may take more than polynomial time, however, to find a potential solution. NP-hard problems are at least as hard as any problem in NP.

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, may be optimized to find an itinerary, which is encoded in a set of variables representing the optimized solution to the problem. For example, given a list of locations, the problem may consist of finding the shortest route that visits all locations exactly once. Other examples of optimization problems include Maximum Independent Set, integer programming, constraint optimization, factoring, prediction modeling, and k-SAT. These problems are abstractions of many real-world optimization problems, such as operations research, financial portfolio selection, scheduling, supply management, circuit design, and travel route optimization. Many large-scale decision-based optimization problems are NP-hard. See e.g., "A High-Level Look at Optimization: Past, Present, and Future" e-Optimization.com, 2000.

Simulation problems typically deal with the simulation of one system by another system, usually over a period of time. For example, computer simulations can be made of business processes, ecological habitats, protein folding, molecular ground states, quantum systems, and the like. Such problems often include many different entities with complex interrelationships and behavioral rules. In Feynman it was suggested that a quantum system could be used to simulate some physical systems more efficiently than a UTM.

Many optimization and simulation problems are not solvable using UTMs. Because of this limitation, there is need in the art for computational devices capable of solving computational problems beyond the scope of UTMs. In the field of protein folding, for example, grid computing systems and supercomputers have been used to try to simulate large protein systems. See Shirts et al., 2000, *Science* 290, pp. 1903-1904, and Allen et al., 2001, *IBM Systems Journal* 40, p. 310. The NEOS solver is an online network solver for optimization problems, where a user submits an optimization problem, selects an algorithm to solve it, and then a central server directs the problem to a computer in the network capable of running the selected algorithm. See e.g., Dolan et al., 2002, *SIAM News* Vol. 35, p. 6. Other digital computer-based systems and methods for solving optimization problems can be found, for example, in Fourer et al., 2001, *Interfaces* 31, pp. 130-150. All these methods are limited, however, by the fact they utilize digital computers, which are UTMs, and accordingly, are subject to the limits of classical computing that impose unfavorable scaling between problem size and solution time.

Integer Programming

Integer programming is a type of discrete optimization problem and has many real-world applications. Some of these applications include resource management, capital budgeting, set covering, and the Traveling Salesman problem. Unless a problem is unfeasible, given a set of constraints, an integer programming problem has an optimal solution. However, large scale problems require a substantial amount of computational power to find the optimal solution. There are usually techniques to find near-optimal solutions that don't require as much time or effort, but in the business world the difference between optimal and near-optimal solutions to business problems can amount to millions of dollars. Thus, there is motivation to develop methods to efficiently find optimal solutions, or failing that, to find near-optimal solutions closer to the optimal solution as compared to what is traditionally found by the art.

Integer programs are defined over a set of n variables $\{x_1, x_2, \ldots, x_n\}$ where variable $x_i$ assumes one of $D_i$ possibilities (which is indicated as $\{0, 1, \ldots, D_i-1\}$). Typically, the objective function $O(x)$ being minimized is linear in the $x_i$, i.e., $O(x) = \sum_{j=1}^{n} r_j x_j$. More generally, optimization problem may allow for quadratic objectives, $$\text{objective: } O(x) = \sum_{i=1}^{n} \sum_{j=1}^{n} Q_{i,j} x_i x_j + \sum_{j=1}^{n} r_j x_i, \quad (1)$$

where there are up to pairwise interactions between the n variables.

Additionally, there may be at least one of equality constraints and inequality constraints that are to be respected by any solution. Often, these constraints are also required to be linear. A single equality constraint is of the form $$\sum_{j=1}^{} a_j x_j = b.$$

If there are $n_=$ constraints (indexed by i) representing equality constraints, then these can be written as:

$$\text{equality: } \sum_{j=1}^{n} A_{i,j} x_j = a_i \text{ for } i = \{1, 2, \ldots, n_=\}, \quad (2)$$

One can express these constraints succinctly as $Ax=a$ where A is an $n_= \times n$ matrix and a is an $n_= \times 1$ vector. Similarly, one can allow for $n_\leq$ inequality constraints representing inequality constraints and having the form $$\text{inequality: } \sum_{j=1}^{n} C_{i,j} x_j \leq c_i \text{ for } i = \{1, 2, \ldots, n_\leq\}, \quad (3)$$

Expressed as a matrix relationship, this is written as $Cx \leq c$ where C is $n_\leq \times n$ and c is $n \times 1$.

BRIEF SUMMARY OF THE INVENTION

At least one embodiment may be summarized as a method of solving a discrete optimization problem using an analog optimization device, including receiving an objective function and at least one constraint corresponding to the discrete optimization problem; converting the objective function into a first set of inputs for the analog optimization device; converting the at least one constraint into a second set of inputs for the analog optimization device; generating a third set of inputs wherein the thirds set of inputs is at least indicative of at least one penalty coefficient; processing the first set of inputs, the second set of inputs and the third set of inputs with the analog optimization device; and reading out a final state of the analog optimization device wherein at least a portion of a solution to the discrete optimization problem corresponds to the final state of the analog optimization device.

The method may also include categorizing the constraints as either linear constraints or non-linear constraints, and wherein the second set of inputs is comprised of a first subset of linear constraint inputs and a second subset of non-linear constraint inputs. The non-linear constraint may have a predetermined penalty representation corresponding to a known set of inputs for the analog optimization device. Converting the at least one constraint may include converting at least one n-local interaction into a plurality of 2-local interactions, wherein n is greater than 2. The method may further include converting at least one of the first set of inputs, the second set of inputs and the third set of inputs into binary values. The method may further include generating a fourth set of inputs for the analog optimization device wherein the fourth set of inputs is an increasing of the value of at least one of the at least one penalty coefficient; processing the first set of inputs, the second set of inputs and the fourth set of inputs on the analog optimization device; and reading out a second final state of the analog optimization device. Processing the first set of inputs, the second set of inputs and the third set of inputs on the analog optimization device may include combining the first set of inputs, the second set of inputs and the third set of inputs into an energy function to be minimized by the analog optimization device. The method may further include performing a meta-optimization procedure on the energy function to decompose the energy function into a plurality of energy subfunctions. The analog optimization device may take the form of an adiabatic quantum computer. The discrete optimization problem may be an integer programming problem.

At least one embodiment may be summarized as a method of solving a discrete optimization problem, including receiving an objective function and at least one constraint corresponding to the discrete optimization problem on a digital computer; converting the objective function into a first set of inputs for a quantum computer; converting the at least one constraint into a second set of inputs for the quantum computer; generating a third set of inputs for the quantum computer wherein the third set of inputs is indicative of at least one penalty coefficient; sending the first set of inputs, the second set of inputs and the third set of inputs to the quantum computer; generating an initial Hamiltonian; embedding the initial Hamiltonian onto the quantum computer; evolving the quantum computer from the initial Hamiltonian to a final Hamiltonian wherein the final Hamiltonian corresponds to combining at least in part the first set of inputs, the second set of inputs and the third set of inputs; reading out a final state of the final Hamiltonian wherein the final state of the quantum computer corresponds to at least a portion of a solution to the discrete optimization; and returning at least a portion of the solution to the digital computer.

The method may further include converting the inequality constraint into an equality constraint. Converting the objective function may include converting at least one n-local interaction into a plurality of 2-local interactions, wherein n is greater than 2. Sending the first set of inputs, the second set of inputs and the third set of inputs to the quantum processor occurs in a plurality of acts and wherein each act may include sending at least a portion of the first set of inputs, at least a portion of the second set of inputs and at least a portion of the third set of inputs to the quantum computer. The second set of inputs may penalize each final state of the quantum computer that violates one of the constraints. The first set of inputs may cause the final state of the quantum computer to be a minimum of the objective function. The minimum of the objective function may be either a local minimum or a global minimum. The method may further include: generating a fourth set of inputs for the quantum computer wherein the fourth set of inputs is an increase of the value of at least one of the at least one penalty coefficient; generating a second initial Hamiltonian; embedding the second initial Hamiltonian onto the quantum computer; evolving the quantum computer from the second initial Hamiltonian to a second final Hamiltonian wherein the second final Hamiltonian corresponds to combining at least in part the first set of inputs, the second set of inputs and the fourth set of inputs; and reading out a second final state of the second final Hamiltonian. The method may further include performing a meta-optimization procedure on the final Hamiltonian to decompose the final Hamiltonian into a plurality of energy functions wherein each energy function is minimizable on the quantum computer. Performing a meta-optimization procedure may include at least one of cutset conditioning, large neighborhood local searching and min-propagation.

At least one embodiment may be summarized as a system for solving a discrete optimization problem, including a receiver to receive an objective function and at least one constraint corresponding to the discrete optimization problem; a mapper to create an embedding of the objective function and the at least one constraint for an analog optimization device; and an interface to coordinate sending the embedding to the analog optimization device, processing the embedding with the analog optimization device to determine a solution to the embedding, and receiving the solution to the embedding from the analog optimization device.

In some embodiments the analog optimization device includes a quantum computer, and the mapper converts the objective function into a first set of inputs for the quantum computer, converts the at least one constraint into a second set of inputs for the quantum computer, and generates a third set of inputs for the quantum computer wherein the third set of inputs include at least one penalty coefficient. The quantum computer may be an adiabatic quantum computer. The solution may correspond to a final state of the analog optimization device. The final state may be a ground state.

Figure 1:
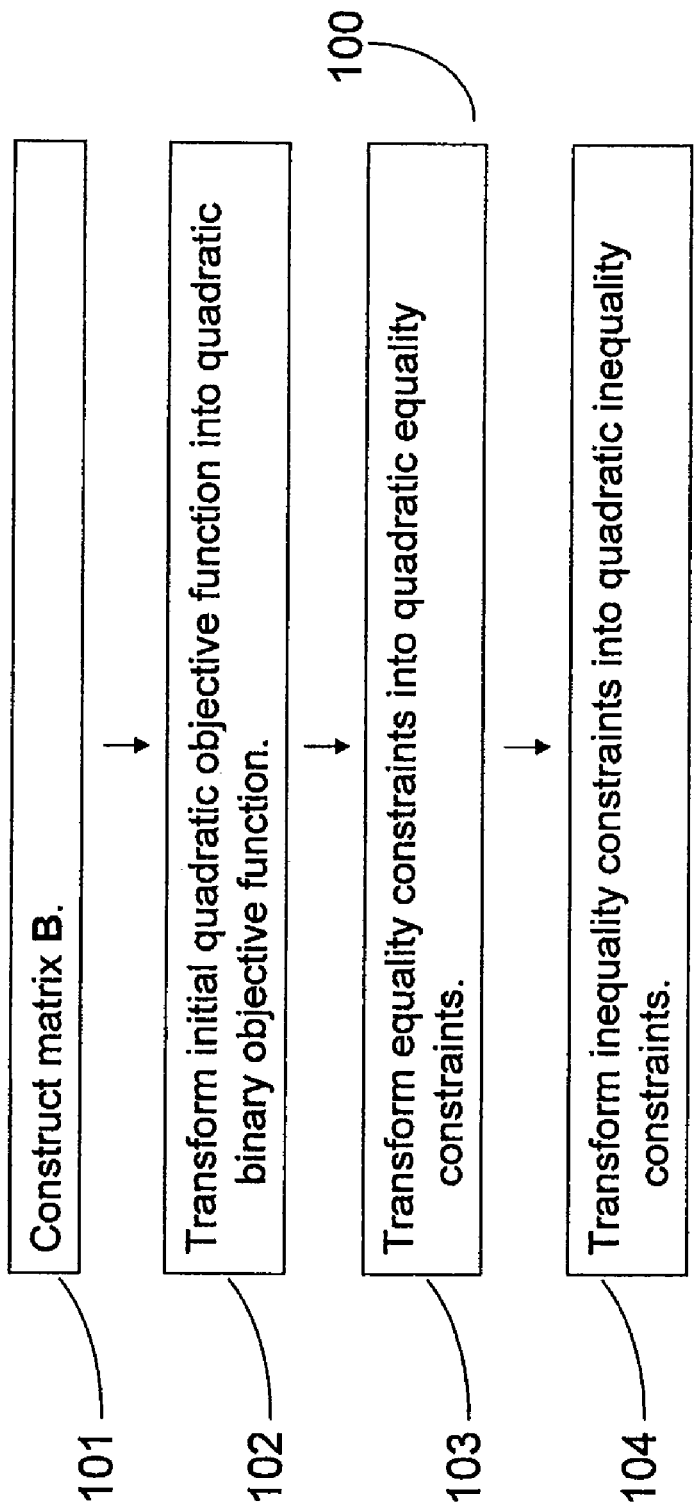
FIG. 1 is a flow diagram illustrating one aspect of a method of solving integer programming and discrete optimization.

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve legibility. Further, the particular shapes of the elements as drawn are not intended to convey any information regarding the actual shape of the particular elements and have been solely selected for ease of recognition in the figures. Furthermore, while the figures may show specific layouts, one skilled in the art will appreciate that variation in design, layout, and fabrication are possible and the shown layouts are not to be construed as limiting the geometry of the present systems, devices, and methods.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with methods and systems for solving integer programming and discrete optimization problems using analog processors have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Quantum computing (QC) may allow for speed-ups for discrete optimization problems. However, many physical realizations of a quantum computer may impose severe restrictions on the types of optimization problems that can be solved. For example, for some QC hardware systems, the following important types of restrictions may arise:

the interactions in the Hamiltonian will be local (in that any given variable can only interact with a small subset of other variables);

interactions may be 2-local in that any given variable interacts with only one other variable;

physical variables may be binary whereas problem variables may not;

real problems may have associated constraints that need to be satisfied by any minimizing solution, but there may be no direct way to impose such constraints with the physical realization of the quantum computer; and real problems may be larger than the capacity of the physical realizations of the QC such that that large problems may need to be decomposed into a sequence of smaller problems.

The solution of many real problems will require circumvention of these restrictions.

An analog optimization device, such as analog circuitry or a device which is capable of conducting classical annealing, could be used to solve problems that a QC hardware system is capable of solving, as is outlined herein. While there may not be quantum speedup in all cases, one of skill in the art would appreciate that the optimization procedures outlined to be processed with a QC hardware system can also be processed with an analog optimization devices.

Integer programming is a mature well-understood approach to constrained discrete optimization problems. Much is known about modeling discrete problems as integer programs, and sophisticated algorithms are available to solve integer programs. Nevertheless, the solution of integer programs remains inherently intractable. The restrictions noted above may be circumvented so that integer programs and more general discrete optimization problems may be solved with even those QC hardware systems subject to the restrictions.

Removing Binary Variable Constraints

Certain hardware implementations of QC may involve binary variables, for which the domain size $D_i=2$ for all variables. It is desirable to be able to handle general discrete optimization problems having arbitrary $D_i$ by transforming such optimization problems into problems defined over binary optimization variables.

Any variable assuming $D_i$ values can be represented in binary with $\lceil \log_2 D_i \rceil$ bits. So for example if $D_i=4$ the $x_i=0, 1, 2$ or $3$ possibilities are encoded using 2 bits where the following correspondence is made $00 \leftrightarrow 0$, $01 \leftrightarrow 1$, $10 \leftrightarrow 2$, and $11 \leftrightarrow 3$, which is the binary representation of the allowed $x_i$ values.

In general, $\lceil \log_2 D_i \rceil$ qubits needed to represent $x_i$ may be labeled with the binary vector $z_i$ which has length $\lceil \log_2 D_i \rceil$. The possible values for $x_i$ are encoded as $x_i = \sum_{\alpha=1}^{\lceil \log_2 D_i \rceil} 2^{\alpha-1} z_{i,\alpha} = b_i^T z_i$, where the components of the binary coefficient vector $b_i$ are $b_{i,\alpha}=2^{\alpha-1}$. In this representation it must be ensured that values of $x_i$ are not represented greater than $D_i$. This can occur if when $D_i$ is not a power of two. In such cases, the linear constraint $b_i^T z_{i,\alpha} \leq D_i - 1$ is also added. For example, if $D_2=3$, bit values 00,01 and 10 are allowed but 11 is not. The linear constraint $b^2 z_2 = 2z_{2,2}+z_{2,1} \leq 2$ would prevent bit value 11 from occurring.

Next, the vector z is defined to be the concatenation of all n $z_i$ vectors. z has dimension D where $$D = \sum_{i=1}^{n} \lceil \log_2 D_i \rceil.$$

z is the optimization variable which contains the bits defining values for all the $x_i$. Further, the n×D matrix B is defined so that x=Bz. Explicitly $$x = \begin{bmatrix} x_1 \\ x_2 \\ \vdots \\ 0^T \end{bmatrix} = \begin{bmatrix} b_1^T & 0^T & \cdots & 0^T \\ 0^T & b_2^T & \cdots & 0^T \\ \vdots & \vdots & \ddots & \vdots \\ 0^T & 0^T & \cdots & b_n^T \end{bmatrix} \equiv Bz \quad (4)$$

with each 0 being an appropriately sized row vector consisting of all zeros. The matrix B is n×D.

The matrix form of the quadratic constrained optimization problem, as seen in equation (1), can be written:

$x^T Q x + r^T x$ such that $Ax=a$, and $Cx \leq c$, where Ax=a is the matrix representation of the set of all equality constraints and $Cx \leq c$ is the matrix representation of the set of all inequality constraints. After converting x into the binary form Bz, the optimization problem becomes the quadratic binary program $z^T \hat{Q} z + \hat{r}^T z$ such that $\hat{A}x=\hat{a}$, and $\hat{C}x \leq \hat{c}$ where $$\hat{Q} = B^T Q B, \hat{r} = B^T r, \hat{A} = AB, \hat{C} = \begin{bmatrix} CB \\ B \end{bmatrix}, \hat{c} = \begin{bmatrix} c \\ d \end{bmatrix}$$

and d is the n vector whose $i^{th}$ component is $d_i = D_i - 1$. The extra inequality constraints which have been appended as rows to $\hat{C}$ and $\hat{c}$ account for the $x_i \leq D_i - 1$ requirements to ensure that the binary variables do not exceed the corresponding $D_i$. Generally, the number of these constraints equals the number of variables $x_i$ that are converted to binary. However, it is not necessary to append all the $x_i \leq D_i - 1$ constraints, as those constraints only need to be added when violating such a constraint is possible. For example, if $D_i = 4$ there is no need of additional constraints since $x_i = 2z_{i,2}+z_{i,1}$ can not exceed 3. Only in cases where $\log_2 D_i$ is not an integer ($D_i$ is not a power of two) do inequality constraints need to be added.

In summary, the procedure which "binarizes" any quadratic optimization problem is described in FIG. 1. Q and r parameterize the n variable objective function to minimize, and A, a and C, c parameterize linear equality and inequality constraints that must be satisfied. The vector $D \equiv [D_1, \ldots, D_n]$ gives the domain size of each optimization variable. $\hat{Q}$, $\hat{r}$, $\hat{A}$, $\hat{a}$, $\hat{C}$ and $\hat{c}$ represent the parameters for the new binary quadratic optimization problem. The matrix B maps binary variables to values in the original problem formulation.

Method 100 begins, in 101, by constructing matrix B with dimensions D as described in Eq. (4). The initial quadratic objective functions Q and r are transformed into binary quadratic objective function $\hat{Q}$ and $\hat{r}$ through $\hat{Q}=B^T QB$ and $\hat{r}=B^T r$, respectively, in 102. Finally, the quadratic and linear equality constraints A and a are binarized in 103 through the processes $\hat{A} \leftarrow AB$ and $\hat{a} \leftarrow a$ and the quadratic and linear inequality constraints C and c are binarized in 104 through the processes $$\hat{C} \leftarrow \begin{bmatrix} CB \\ B \end{bmatrix} \text{ and } \hat{c} \leftarrow \begin{bmatrix} c \\ D-1 \end{bmatrix},$$

where 1 is used to represent a vector of length n all of whose components are 1.

Removing Locality Restrictions

Most physical implementations of QC will require that each variable interact with only a small set of well defined other variables. Two variables $x_i$ and $x_j$ which interact (i.e., have non-zero $Q_{i,j}$) must be connected. In general, problems may require connectivity that is not reflected in the physical hardware of a the quantum computer solving at least part of the problem. Such problems may be solved via graph embedding, such as described in U.S. Patent Application Ser. No. 60/864,129, titled "Graph Embedding Techniques", filed Nov. 2, 2006.

Removing 2-Local Restrictions

Often times the objective functions that arise in commercially relevant problems have interactions which involve more than a pair of variables. The simplest example of such a case is an interaction which couples 3 variables (say $x_i, x_j, x_k$) as $x_i x_j x_k$. Another important example arises in scheduling or routing problems. In many problems a set of variables may represent an order in which packages are delivered to customers. Let $x_i$ represent the delivery of the $i^{th}$ package. If there are n packages $x_1, \ldots x_n$ then one may allow $x_i$ to assume one of n possibilities (so that $D_i=n$). For n=4 packages the assignation $x_1=2, x_2=1, x_3=4, x_4=3$ would mean that package 2 is delivered first, followed by package 1, followed by package 4, followed lastly by package 3. In this simple example it makes no sense for any pair of variables to assume the same value so there is a constraint that requires all 4 variables to be different. Therefore, an "all-different" constraint couples all variables.

A generally applicable method to reduce an arbitrary function of binary variables to the form $$\sum_{ij} Q_{ij} x_i x_j + \sum_i r_i x_i$$

a form where only quadratic or linear interactions, is needed. The requirement that each $x_i$ is binary, such that it can assume the value of either 0 or 1, is not a limiting assumption as has been seen in Removing Binary Variable Constraints.

The reduction to quadratic interactions is accomplished by the introduction of new ancillary variables which are minimized over. An arbitrary function $E(x)$ may be represented as the minimizer of an x-dependent quadratic function $\tilde{E}$ of the ancillary variables and the original variables x. With the vector of ancillary variables indicated as y, it can be written that:

$$E(x) = \min_y \tilde{E}(x, y),$$

where $\tilde{E}(x, y)$ is quadratic.

It may be desirable to minimize the number of new variables y that are introduced and an approach to minimizing the number of ancillary variables was first discussed in Rosenberg, "Reduction to bivalent maximization to the quadratic case", *Cahier du Centre d'Etudes de Recherche Operationelle*, 17:71-74, 1975, and a short algorithm is presented in Boros, et al., Technical Report Rutcor Research Report RRR48-2001, Rutgers, September 2001. Common to these approaches is the introduction of new Boolean variables $y_{i,j}$ for products $x_i x_j$ appearing in $E(x)$. The constraint $y_{i,j}=x_i x_j$ can be enforced by the quadratic penalty function $$H(x_i, x_j, y_{i,j}) = x_i x_j - 2(x_i + x_j) y_{i,j} + 3 y_{i,j} \quad (5)$$

$$H(x_i, x_j, y_{i,j}) = [x_i \ x_j \ y_{i,j}] \begin{bmatrix} 0 & 1/2 & -1 \\ 1/2 & 0 & -1 \\ -1 & -1 & 0 \end{bmatrix} \begin{bmatrix} x_i \\ x_j \\ y_{i,j} \end{bmatrix} +$$

$$[0 \ 0 \ 3] \begin{bmatrix} x_i \\ x_j \\ y_{i,j} \end{bmatrix}.$$

The penalty function is zero if $y_{i,j}=x_i x_j$ and greater than zero otherwise so that by adding a positive multiple H into the energy function and minimizing, one can ensure that $y_{i,j}$ represents the product. Therefore, a cubic term $x_i x_j x_k$ can be reduced to the quadratic term $y_{i,j} x_k + \lambda H(x_i, x_j, y_{i,j})$ where $\lambda > 0$ is sufficiently large. Those of ordinary skill in the art would appreciate that this approach generalizes to interactions of higher order through the introduction of additional y variables representing products.

Any n binary optimization variable may be converted to the form:

$$E(x) = \sum_b \alpha_b \Phi_b(x)$$

where the summation is over all $2^n$ possible bit vectors b of length n, the $\alpha_b$ are coefficients, and each $\Phi_b$ is a term containing any number of interacting variables:

$$\Phi_b(x) = \sum_{1 \le i \le n} x_i^{b_i}$$

The minimal set of $\{y_{i,j}\}$ that reduces all $\Phi_b$ to degree 2 or less may then be sought.

Figure 2A:
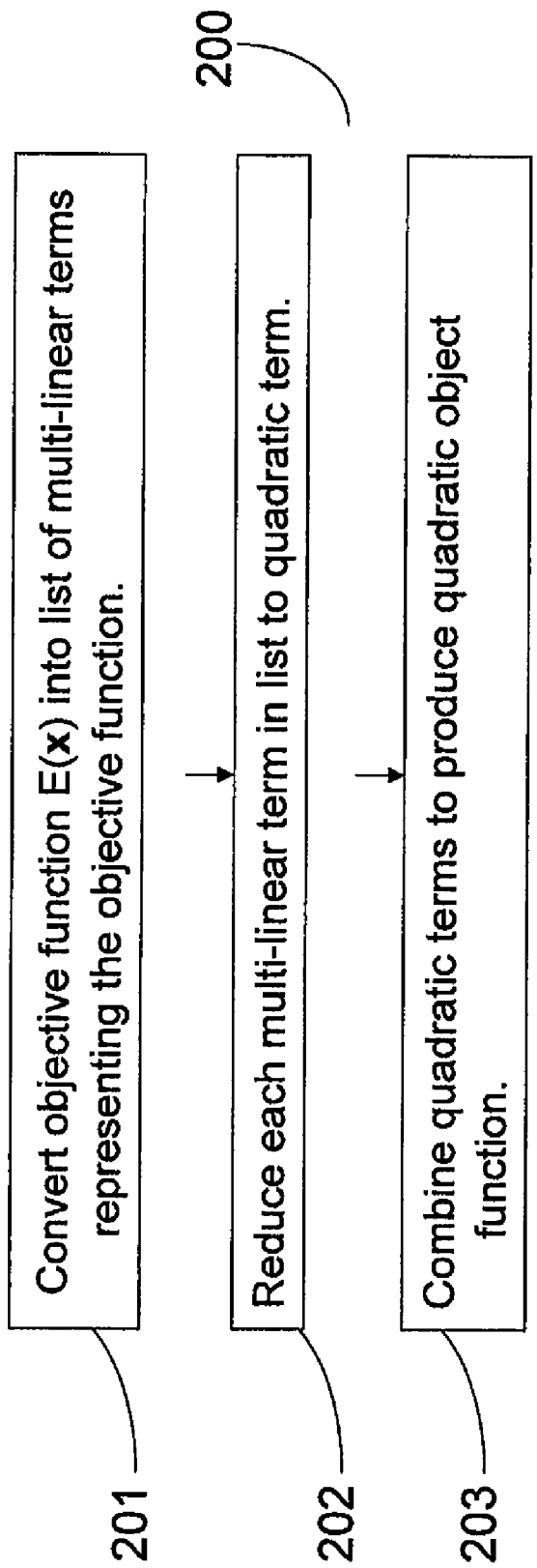
FIGS. 2A, 2B and 2C are flow diagrams illustrating one aspect of a method of solving integer programming and discrete optimization.

In FIG. 2A, a representation of an objective function $E(x)$ to be minimized (constraints if present are assumed to have been incorporated as penalties into E) is taken as input by the method 200 and returned is a quadratic representation of the function. When $E(x)$ is fed as an input, 201 returns a set of coefficients $\alpha$ such that $$E(x) = \sum_b \alpha_b \Phi_b(x)$$

where the sum is over all bit vectors b of length n. $E(x)$ may be represented as a tabulated list of values at all $2^n$ possible inputs, and to obtain the coefficients $\alpha$ it may be necessary to solve a lower triangular linear system. If n is large then this direct approach may not work, as there may be too many possible x values for an efficient solution to be created. However, for many problems, $E(x)$ is the sum of contributions with each contribution depending on only a few variables. In this case $E(x) = \Sigma_\gamma E_\gamma(x_\gamma)$, where $x_\gamma$ is a small subset of all possible variables. $E(x)$ can be decomposed into its multilinear representation (201) by decomposing each $E_\gamma$ which is tractable and then adding the contributions from each $\gamma$.

Alternatively $E(x)$ may be represented as an explicit mathematical formula. In this case too, the multilinear representation can be found by effectively generating the tabular list and then applying the above procedure. Often, this may be done without explicitly ever forming the tabular list.

Whatever the representation of $E(x)$, 201 returns a list of non-zero $\alpha_b$ values. For example $\alpha = \{\alpha_{0010}=3, \alpha_{1011}=-1, \alpha_{1111}=2\}$ represents the function $$f(x_1, x_2, x_3, x_4) = 3x_3 - x_1 x_3 x_4 + 2x_1 x_2 x_3 x_4$$

Knowing the non-zero interaction terms, 202 may be used to find a small set of ancillary variables to reduce the degree of terms to less than three. For each $\alpha_b$ in E, one may record into obj the 1 or 2 variables now representing each multilinear term. A list of the definitions of the new variables indicating which variables compose the factors of the product is contained within vars. In this example, $x_1 x_4$ can be replaced by $y_{1,4}$, reducing the second term to a quadratic interaction, and then $x_2 y_{1,4}$ can be replaced by $y_{1,2,4}$ to reduce the third term to a quadratic interaction. Obj would contain three entries, $y_{1,4}$ and $y_{1,2,4}$, while vars would contain the variables that $y_{1,4}$ and $y_{1,2,4}$ replaces ($x_1$ and $x_4$ for $y_{1,4}$; $x_2$ and $y_{1,4}$ for $y_{1,2,4}$).

Figure 3B:
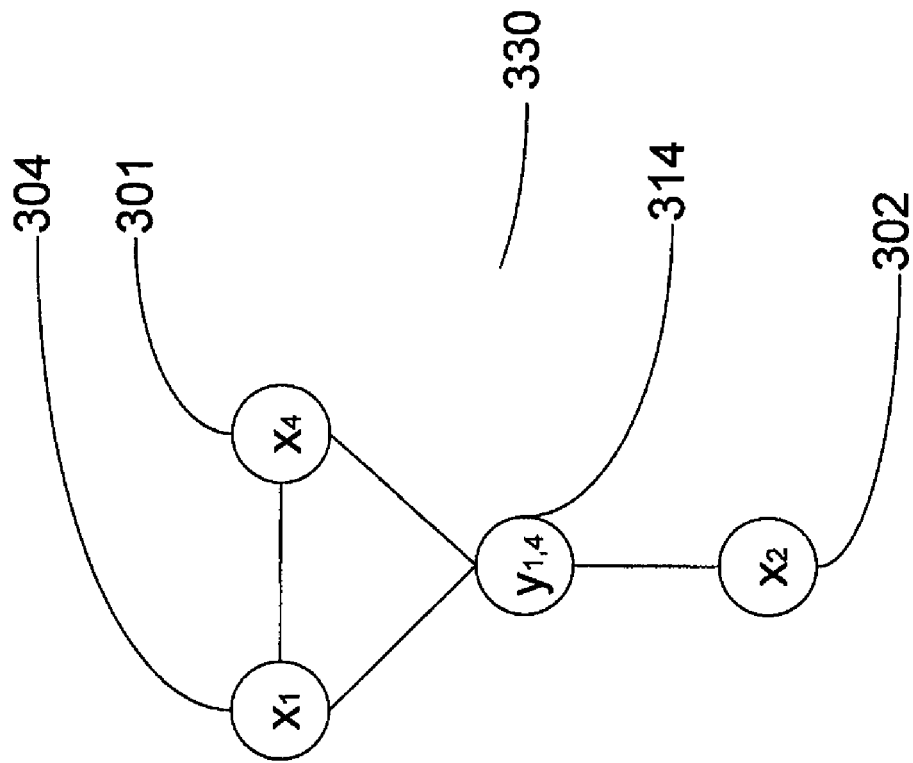
FIGS. 3A, 3B and 3C are schematic diagrams illustrating one aspect of a method of integer programming and discrete optimization.

That is to say, since the quantum hardware is capable of representing 2-local interact terms, in order for $x_1 x_3 x_4$ to be encoded into the hardware the 3-local interaction is made of a plurality of 2-local interactions. Two local interactions are represented as a solid line connecting two variables in FIGS. 3A-3C. As seen in FIG. 3B, because only one variable is able to interact with one other variable directly, a third variable is used to produce a 3-local interaction (330). In FIG. 1A, a quadratic interaction variable $y_{1,4}$ (314) is created in 300. $x_1$ (301) interacts directly with $x_4$ (304) and with the quadratic interaction variable $y_{1,4}$ (314). $y_{1,4}$ (314) then directly interacts with $x_2$ (302) to produce, as shown in FIG. 3B, a 3-local interaction (350) comprised solely of 2-local interactions. Similarly, FIG. 3C extends this principle to produce a 4-local interaction (360) comprised solely of 2-local interactions. The cubic interaction variable $y_{1,2,4}$ (312) is created by having $y_{1,4}$ (314) interact with $x_2$ (302) and the cubic interaction variable $y_{1,2,4}$ (312). $y_{1,2,4}$ (312) can then interact with $x_3$ (303) to create the 4-local interaction $x_1 x_2 x_3 x_4$ as was required by the function $f(x_1, x_2, x_3, x_4)$ above.

Figure 2B:
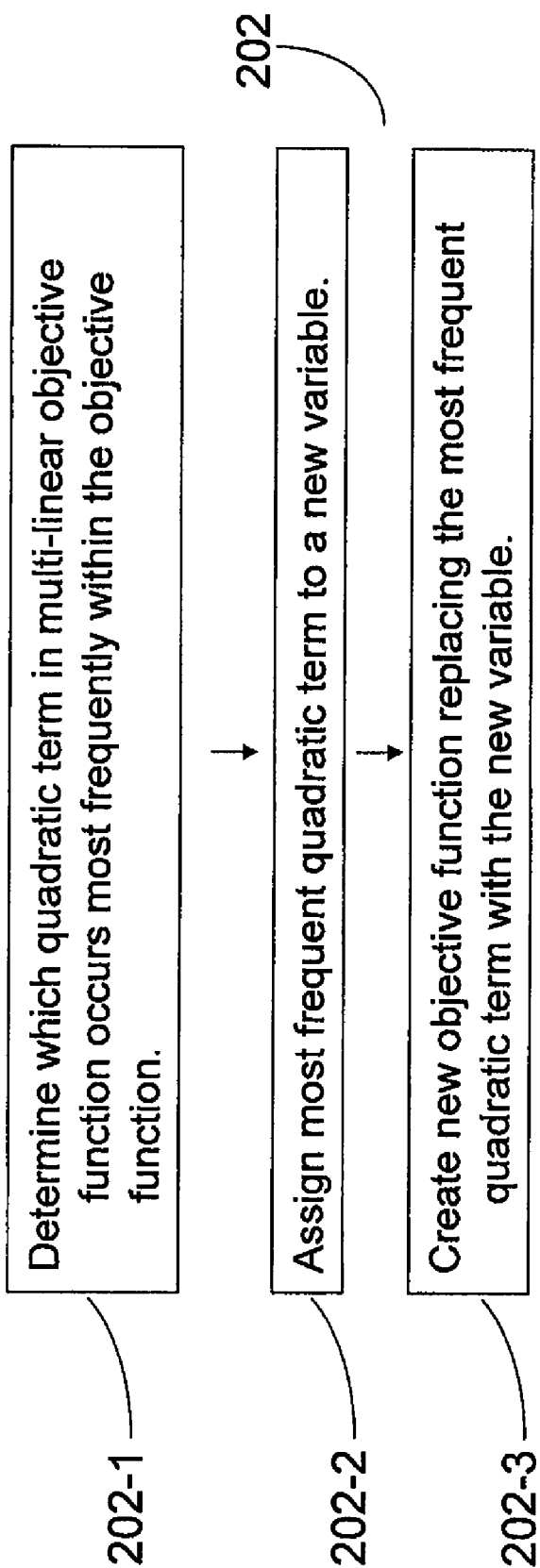
Figure 3A:
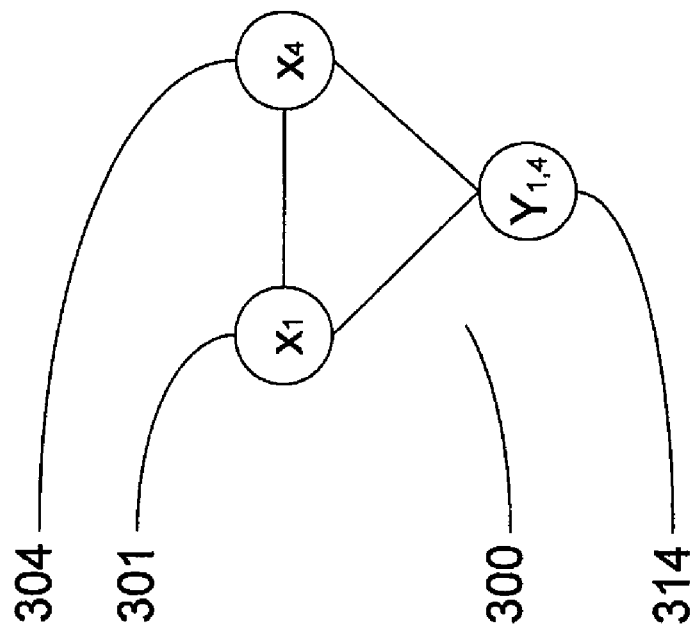
Figure 3C:
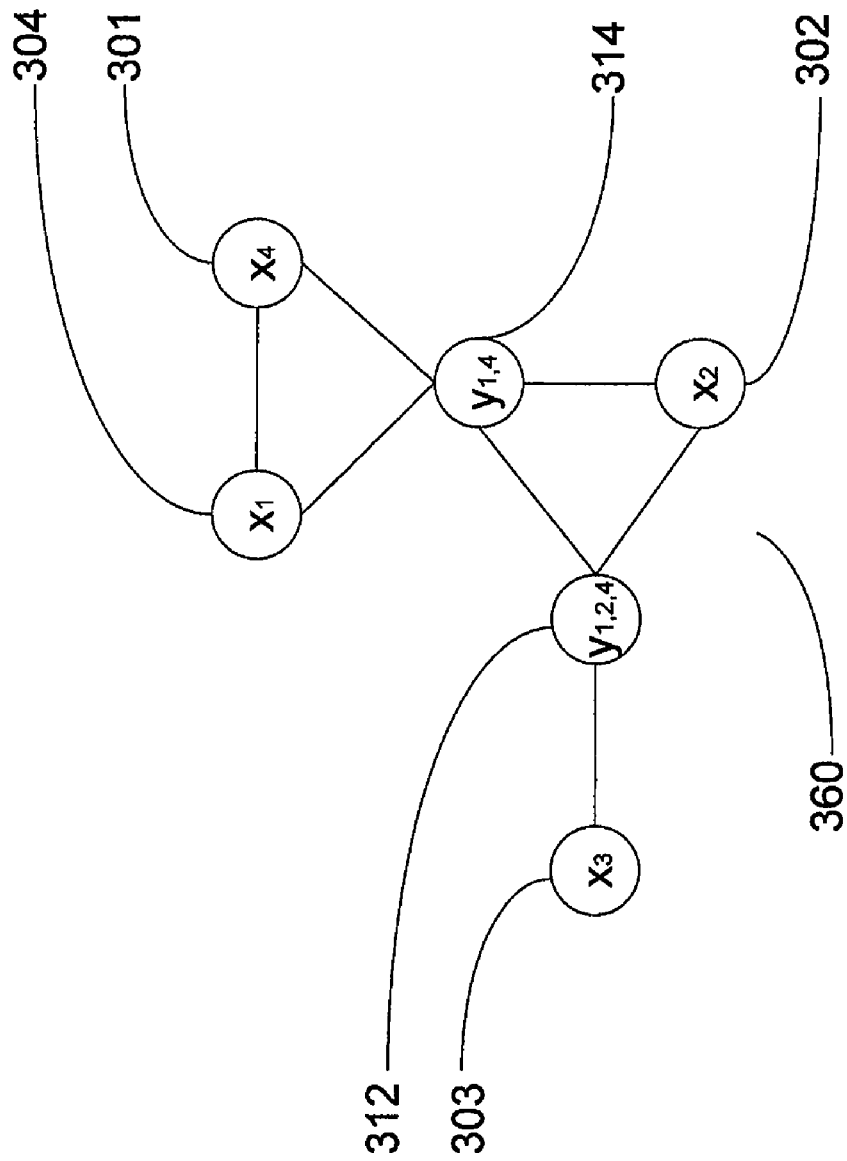

In FIGS. 2A and 2B, 202 works by counting the number of occurrences of every possible pair of variables in the objective function and selecting the pair that occurs most frequently. This pair is then assigned to a new variable $y_{i,j}$ in obj. Having defined the new variable, the objective function is simplified (in procedure SIMPLIFY) by replacing the pair $x_i$, $x_j$ by $y_{i,j}$. This reduces the degree of all terms containing the pair by 1 and this procedure is iterated until all terms are reduced to degree 2 or less. In 202-1, obj is inspected and each quadratic term in the multi-linear objective function is summed. The most frequently occurring quadratic term is assigned to a new variable in 202-2, as is shown in FIG. 3A. A new objective function is created incorporating the new variable to replace the formerly most common quadratic term in 202-3. If the new objective function is not solely comprised of either linear or quadratic terms, one may desire to repeat acts 202-1 to 202-3 until such criteria is met. See FIGS. 3A-3C for an exemplary embodiment of this procedure.

Figure 2C:
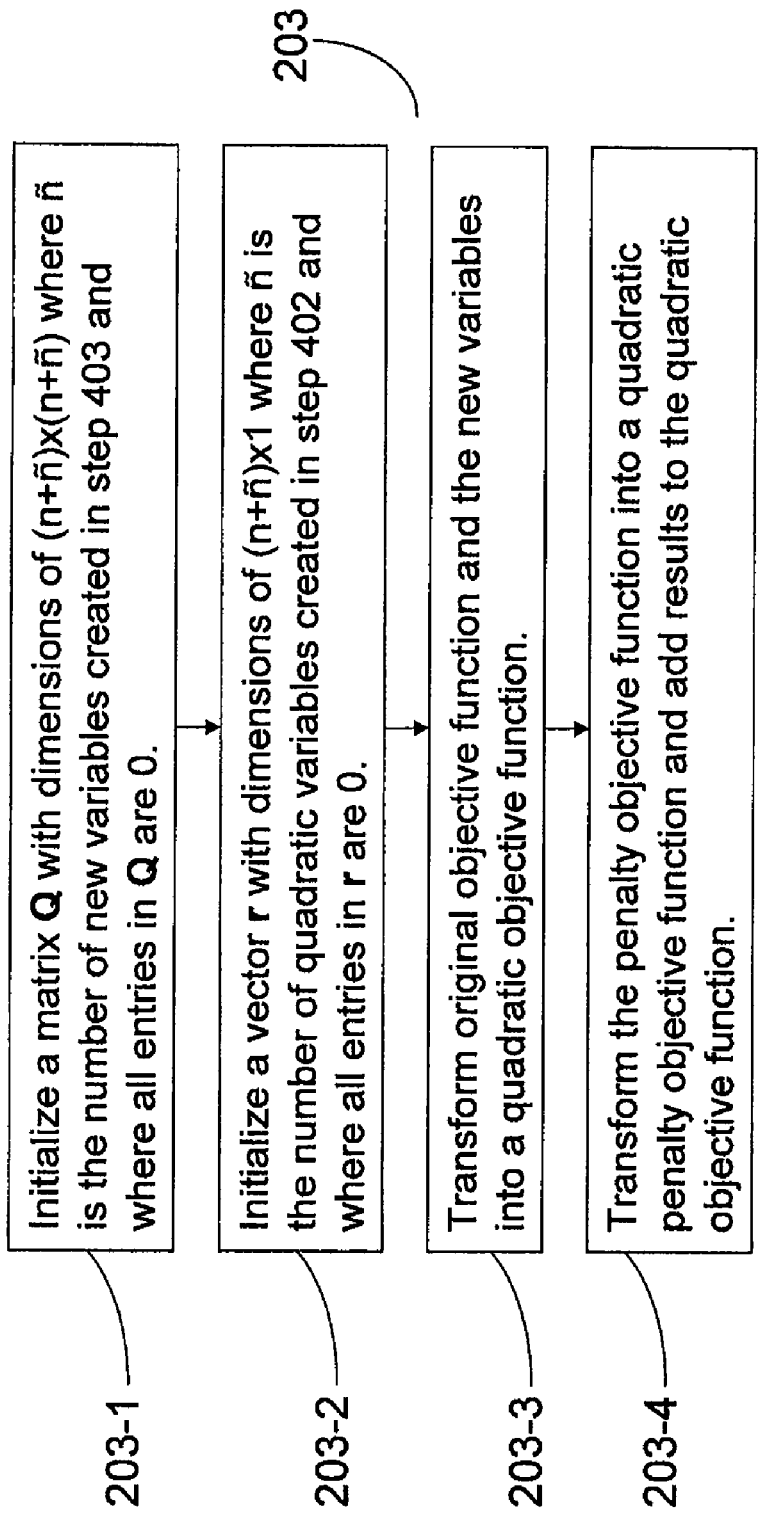

The procedure 203 of FIGS. 2A and 2C initially builds the Q, r matrices describing the quadratic form in 203-1 and 203-2, respectively. If ñ new variables are introduced by 202, then Q and r have dimensions (n+ñ)×(n+ñ) and (n+ñ)×1 respectively. Then the contribution from the objective function is added (203-3), and then the contribution from the penalty function H is added (203-4). Q is ensured to be symmetric in 203-3. In 203-4, using the results of Eq. (5), there is an introduction of a positive penalty parameter λ which is used to turn penalty functions into quadratic objective functions with weights. λ may be made large enough to ensure that the constraints on the ancillary product variables are satisfied.

Incorporating Constraints

Some QC realizations may not have a direct method through which to enforce the satisfaction of constraints associated with the optimization of an integer programming problem. Rather, the QC hardware system will be tasked with the minimization of some objective. Fortunately, the well developed theory of Lagrange multipliers, and more specifically their extension to the case of discrete variables, can be leveraged to resolve this problem. This section demonstrates the most common cases of optimization problems having linear equality and/or inequality constraints may be solved using the present systems, methods and apparatus. First described is a general approach applicable to arbitrary constraints, then described are procedures for more efficient constraint formulations tailored for specific constraint types.

Equality Constraints

Wah et al., The theory of discrete Lagrange multipliers for nonlinear discrete optimization, Principles and Practice of Constraint Programming, pp. 28-44,1999 and Wu, Z., The theory and applications of discrete constrained optimization using Lagrange multipliers, PhD thesis, Dept. of Computer Science, Univ. of Illinois, May 2001 (Wu01) discuss solving equality constraints. An exemplary problem is $$\min_x O(x) \text{ subject to } t(x) = 0, x_i \in \{0, 1\}$$

where t has $n_=$ components (i.e., there are $n_=$ constraints). Since there is a technical requirement for constraints to be squared, linear constraints $t(x) = Ax - a$ are employed. Given the results from Removing 2-Local Restrictions, it may be assumed that $O(x)$ is quadratic and may be parameterized by Q and r. As variables will likely be represented on digital computers, all numerical coefficients defining Q, r, A, and a will be rational, and by appropriate multiplication can be made integral.

Motivated by the continuous case, the Lagrangian form of the equality constraints may then be considered:

$$L(x, \lambda) = O(x) + \sum_{1 \leq i \leq n_=} \lambda_i H(t_i(x))$$

Unlike the continuous case, the Lagrangian form includes a function H which is a non-negative continuous function satisfying $H(y)=0$, if and only if $y=0$. Possible simple choices for $H(y)$ are $|y|$ or $y^2$. It can be shown, as seen in Wah et al., *The theory of discrete Lagrange multipliers for nonlinear discrete optimization*, Principles and Practice of Constraint Programming, pp. 28-44, 1999 and Wu, Z., *The theory and applications of discrete constrained optimization using Lagrange multipliers*, PhD thesis, Dept. of Computer Science, Univ. of Illinois, May 2001, if the $\lambda_i$ are positive and sufficiently large that locally minimizing L will locally minimize the objective $O(x)$ and satisfy the constraints $t(x)=0$. If all equality constraints $t_i(x)$ are linear, i.e., $t(x)=Ax-a=0$, and $H(y)=y^2$ is used then L is quadratic and can be implemented on a physically realizable QC hardware systems. Specifically $$L(x, \lambda) = O(x) + \sum_{1 \leq i \leq n_=} t_i^2(x) = x^T Q x + r^T x + (Ax - a)^T \Lambda (Ax - a)$$

where $\Lambda$ is a $n_= \times n_=$ diagonal matrix whose i,i entry is $\lambda_i$. The Lagrangian function to be minimized by the QC hardware system is quadratic. Thus, converting equality constraints to the form shown above and minimizing them ensures that they are adhered to by the objective function.

Depending on the problem, the Lagrange multiplier parameters may be set directly to a sufficiently large value (which may be determined from knowledge about the problem), or may be solved as a sequence of problems with increasing $\lambda_i$ variables. This latter approach is common in classical continuous optimization where the Lagrange multipliers at iteration t+1 are updated according to $$\lambda_i^{t+1} = \lambda_i^t + \beta^t H(t_i(x(\lambda^t))).$$

In the above equation, $x(\lambda^t)$ is the minimizer of $L(x, \lambda^t)$ and $\beta^t$ are positive increasing parameters (i.e., $\beta^{t+1} > \beta^t$). Once $\lambda^t$ has been updated to $\lambda^{t+1}$ according to the above prescription, a new $x(\lambda^{t+1})$ can be obtained by minimizing $L(x, \lambda^{t+1})$.

Inequality Constraints

Inequality constraints are treated by converting inequalities into equalities. Consider the inequality constraint $Cx - c \leq 0$ where $C$ has $n_\leq$ rows (i.e., there are $n_\leq$ inequality constraints). Write the constraint matrix as $$C = \begin{bmatrix} \kappa_1^T \\ \vdots \\ \kappa_{n_\leq}^T \end{bmatrix},$$

such that $\kappa_i$ is the $i^{th}$ row of $C$, and corresponds to the constraint $\kappa_i^T x - c_i \leq 0$. This $i^{th}$ inequality constraint is converted to an equality constraint with the introduction of a slack variable $w_i$ assuming a positive integer value. Since all elements of $\kappa_i$ and $c_i$ are integer values, $w_i$ is an integer in the range $[0, M_i]$ where $-M_i$ is the minimum possible value of $\kappa_i^T x - c_i$, or the slack. Since $x$ is a binary vector, $M_i$ can be found as $M_i = -\Sigma_j \theta(-\kappa_i(j)) \kappa_i(j) + c_i$, where the step function $\theta(x)$ is defined so that $\theta(x) = 1$ if $x \geq 0$ and 0 otherwise, and where $\kappa_i(j)$ is the $j^{th}$ component of $\kappa_i$. In the case where all optimization variables are restricted to being binary, the integer $w_i$ represents the slack, such that $w_i \in [0, M_i]$, may be replaced by its binary representation.

The slack variable $w_i$ may be represented with $\lceil \log_2 M_i \rceil$ bits as outlined in Removing Binary Variable Constraints. However, it is not necessary to add the inequality constraint $b_i^T z_i \leq M_i$ to $w_i = b_i^T z_i$, as the existing equality constraint $c_i^T x + w_i = d_i$ will prevent $w_i$ from exceeding $M_i$. Thus all inequality constraints are removed.

Letting $w = [w_1; \ldots; w_{n_\leq}]$ the inequality constraints $Cx \leq c$ are converted to the equality constraints $$[C \; I] \begin{bmatrix} x \\ w \end{bmatrix} - c = 0 \quad x_i \in \{0, 1\}, \; w_i \in \{0, 1, \ldots, M_i\}$$

where $I$ is the $n_\leq \times n_\leq$ identity matrix, $[C \; I]$ is the horizontal concatenation of matrices $C$ and $I$, and $$\begin{bmatrix} x \\ w \end{bmatrix}$$

is the vertical concatenation of vectors $x$ and $w$. Subsequent preprocessing via $w = Bz$ as outlined in Removing Binary Variable Constraints converts this to the pure binary program $$[C \; B] \begin{bmatrix} x \\ z \end{bmatrix} - c = 0$$

with $x_i$ and $z_i$ being binary valued.

Figure 4:
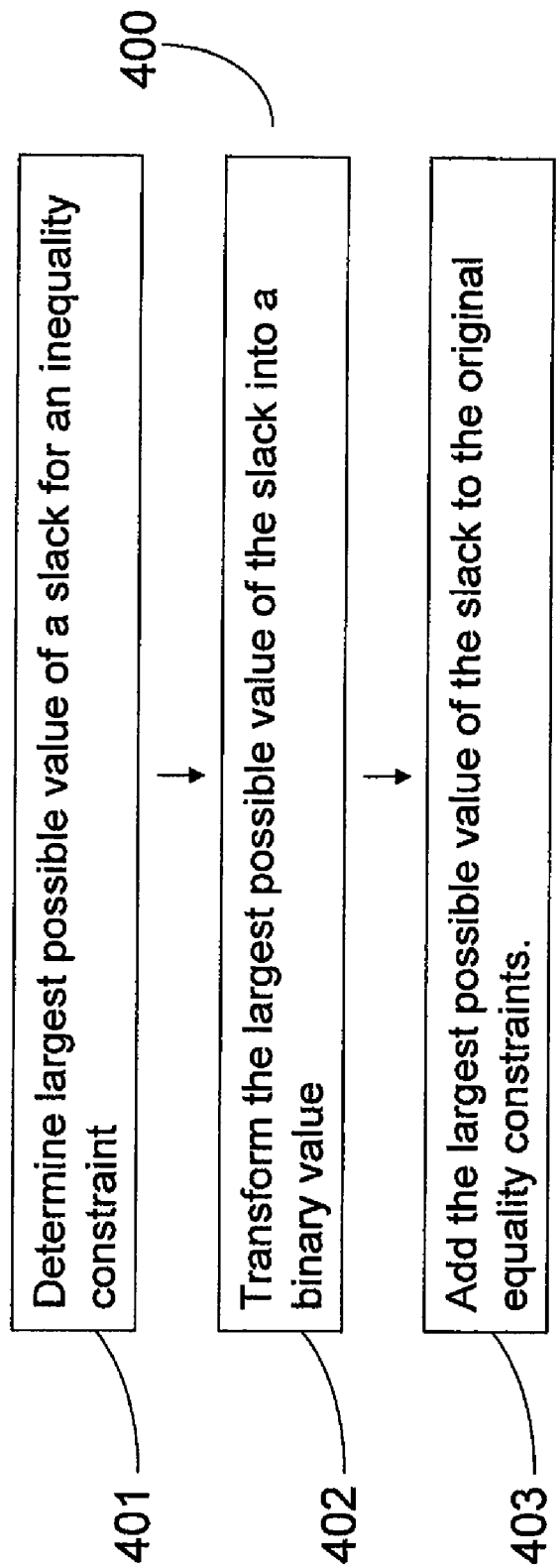
FIG. 4 is a flow diagram illustrating one aspect of a method of solving integer programming and discrete optimization.

Having converted the problem with inequalities to an equivalent problem with equalities, the mechanism developed in Equality Constraints may be applied to solve the equality constrained problem. FIG. 4 shows the procedure 400 for handling inequality constraints. A, a and C, c parameters describing a set of linear equality and inequality constraints respectively. The largest possible value of the slack $M_i$ for an inequality constraints C, c is determined in 401. In 402, $M_i$ is transformed into a binary number B. And in 403 the binary representation of the largest possible value of the slack is added to the original equality constraints there by turning the inequality constraint into an equality constraint by setting $$\hat{A} \leftarrow \begin{bmatrix} A & 0 \\ C & B \end{bmatrix} \text{ and } \hat{a} \leftarrow \begin{bmatrix} a \\ c \end{bmatrix}.$$

A new effective set of linear equality constraints described by $\hat{A}$ and $\hat{a}$.

Specialized Constraints

As physical realizations of QC are likely to be constrained in the number of available physical qubits, it may be desirable to minimize the number of additional variables. For certain types of constraints penalty functions are available which require fewer new variables. Further, in some cases nonlinear constraints may be represented with simple quadratic penalty functions. The general idea is to construct a quadratic penalty function $H(x)$ that is zero when the constraints are satisfied and greater than zero when the constraints are violated. Eq. (5) is one such example which enforces the nonlinear constraint $y = x_1 x_2$. All binary logical functions may be represented with such penalty functions, as shown below.

not: $y = \neg x$ has $H(x, y) = 2xy - x - y + 1$ and: $y = x_1 \wedge x_2$ has $H(x_1, x_2, y) = x_1 x_2 - 2(x_1 + x_2)y + 3y$ or: $y = x_1 \cup x_2$ has $H(x_1, x_2, y) = x_1 x_2 + (x_1 + x_2)(1 - 2y) + y$ xor: $y = x_1 \oplus x_2$ has $H(x_1, x_2, y; a) = x_1 x_2 + (x_1 + x_2)y - 2(x_1 + x_2 + y)a + x_1 + x_2 + y + a - 2$ where $a$ is an extra ancillary variable that is required in order to faithfully represent exclusive or function $\oplus$.

Note that these penalty functions are not unique. Kochenberger, et al., "A unified modeling and solution framework for combinatorial optimization problems," *OR Spectrum* 26(2): 237-250, 2004, provides further examples of specific constraints that are efficiently representable by penalty functions.

Discovering Specialized Constraints

When faced with a problem with constraints that do not have a known specialized penalty function it is useful to be able to derive new penalty functions.

A constraint is assumed to be defined over m Boolean variables and $x$ represents a length m Boolean vector. If F represents the set of feasible $x$ (where $H = 0$), and $\overline{F}$ is the set of infeasible $x$ (where $H > 0$), the constraint, which may be nonlinear, is then represented by the set F.

The function $H(x)$ is written in the Walsh basis: $H(x) = \Sigma_b w_b(x) \alpha_b$, where b is a length m bit vector labeling the $2^m$ Walsh Basis functions which are given by $w_b(x) = \Pi_{i=1}^{m}(2x_i - 1)^{b_i}$. Those of ordinary skill in the art would appreciated that other basis functions (e.g., $w_b(x) = \Pi_{i=1}^{m} x_i$) could be used, where the $\tilde{W}_1$ matrix is updated to reflect the change in the basis function. h is a vector of length $2^m$ whose x component is $h_x = H(x)$, and $\alpha$ is a vector of length $2^m$ whose b component is $\alpha_b$. With this notation, the Walsh expansion of $H(x)$ can be written as $$h = \tilde{W}_m \alpha$$

where $\tilde{W}$ is a $2^m \times 2^m$ matrix whose x, b element is $\tilde{W}_{x,b} = w_b(x)$, such that the basis vectors are stored as the columns of $\tilde{W}$.

The matrix of the $\tilde{W}_1$ of the $w_b(x)$ values for one Boolean variable (m=1) is:

$$\tilde{W}_1 = \begin{bmatrix} 1 & -1 \\ 1 & 1 \end{bmatrix}.$$

Since the basis function are products, tensor products of $\tilde{W}_i$ may be used to determine $\tilde{W}_m$ as $$\tilde{W}_m = \overbrace{\begin{bmatrix} 1 & -1 \\ 1 & 1 \end{bmatrix} \otimes \ldots \otimes \begin{bmatrix} 1 & -1 \\ 1 & 1 \end{bmatrix}}^{m\,times} = \begin{bmatrix} 1 & -1 \\ 1 & 1 \end{bmatrix}^{\otimes m}.$$

It is then possible to find the inverse of $W_m$ as $$W_m = \tilde{W}_m^{-1} = \frac{1}{2^m}\begin{bmatrix} 1 & -1 \\ 1 & 1 \end{bmatrix}^{\otimes m}$$

Thus, the Walsh coefficients for H(x) are given by $\alpha = W_m h$ with $W_m$ given as above.

Since only quadratic interactions are physically realizable, quadratic interactions $\alpha$ are divided into two subsets. The disjoint subsets are defined as $B \equiv \{b | 1^T b \leq 2\}$ and $\overline{B} \equiv \{b | 1^T b > 2\}$ so that B consists of those m-bit strings containing 2 or fewer 1s and $\overline{B}$ consists of these m-bit strings containing 3 or more 1s. Let $\alpha_B = \{\alpha_b | b \in B\}$ and $\alpha_{\overline{B}} = \{\alpha_b | b \in \overline{B}\}$ where $\alpha_B$ indicate the coefficients for interactions of at most second order, and $\alpha_{\overline{B}}$ indicate the coefficients for interactions greater than second order, which may not be realizable in the QC hardware system. h is similarly partitioned into two disjoint subsets corresponding to feasible and infeasible configurations: $h_F = \{h_x | x \in F\}$ (i.e., H(x) for feasible configurations), and $h_{\overline{F}} = \{h_x | x \in \overline{F}\}$ (i.e., H(x) for infeasible configurations). If W is partitioned similarly then the following can be written:

$$\begin{bmatrix} \alpha_B \\ \alpha_{\overline{B}} \end{bmatrix} = \begin{bmatrix} W_{B,F} & W_{B,\overline{F}} \\ W_{\overline{B},F} & W_{\overline{B},\overline{F}} \end{bmatrix} \begin{bmatrix} h_F \\ h_{\overline{F}} \end{bmatrix}.$$

The desired constraints on the system are now imposed. For feasible states it is required that H(x)=0 so $h_F=0$, and H(x)>0 for infeasible x requires that $h_{\overline{F}}>0$. Also, as $\alpha_{\overline{B}}$ are unavailable interactions, it is required that such terms are zero. Consequently, $$\begin{bmatrix} \alpha \\ 0 \end{bmatrix} = \begin{bmatrix} W_{B,F} & W_{B,\overline{F}} \\ W_{\overline{B},F} & W_{\overline{B},\overline{F}} \end{bmatrix} \begin{bmatrix} 0 \\ h_{\overline{F}} \end{bmatrix} \quad (6)$$

or $$\alpha_B = W_{B,\overline{F}} h_{\overline{F}} \text{ and } 0 = W_{\overline{B},\overline{F}} h_{\overline{F}}.$$

The first of these equations gives the expansion coefficients $\alpha_{\overline{B}}$ determining the penalty function H if $h_{\overline{F}}$ is known. The second equation provides the one condition of an allowed set of penalty values and all higher order terms vanish. Further, since it is required that the penalty function be positive, an addition constraint exists, such that $h_{\overline{F}}>0$. Thus, one way to specify the unknown $h_{\overline{F}}$ values is through the linear program (LP)

$$LP(F): \begin{cases} 0 = W_{\overline{B},\overline{F}} h_{\overline{F}} \\ 0 < h_{\overline{F}} \end{cases}. \quad (7)$$

Unlike standard LPs, the constraint on $h_{\overline{F}}$ is that all components are strictly positive (and not $\leq 0$ as is usual). To solve Eq. (7) we solve the following $2^m$ LPs are solved, one for each coordinate j of $h_{\overline{F}}$:

$$\min_x -x_j$$
$$W_{\overline{B},\overline{F}} x = 0$$
$$x \geq 0.$$

Suppose that for all j, there is a solution $x^j$ with negative objective function value, such that all components of $x^j$ are strictly positive. Then $$h_{\overline{F}} = \frac{1}{2m} \sum_{j=1}^{2m} x^j > 0$$

and satisfy Eq. (7). On the other hand, suppose that there exists a j for which the above LP has 0 as its optimal value, then those of ordinary skill in the art will appreciate that Eq. (7) cannot hold as otherwise an $h_{\overline{F}}$ that satisfies Eq. (7) would have a smaller objective function value.

Although LP(F) has no objective function, one may be imposed in order to further constrain $h_{\overline{F}}$ such that it may be necessary for numerical convergence of some LP solvers. Alternatively, a requirement may be imposed such that $1^T h_{\overline{F}}=1$ is a method for setting the overall scale of H. LP(F) can be solved for $h_{\overline{F}}$ using standard linear programming solvers. Once the values $h_{\overline{F}}$ are determined, Eq. (6) may be used to calculate $\alpha_{\overline{B}}$. The solution of $\alpha_{\overline{B}}$ defines the desired second order H(x). If LP(F) has no feasible solution then the constraint set F is not representable with up to quadratic interactions.

When No Quadratic H(x) Exists

There exist constraints F for which a quadratic H(x) does not exist, such as $x_3 = x_1 \oplus x_2$. To solve this problem, ancillary bits may be introduced to add sufficient degrees of freedom for a quadratic function to be realized. Furthermore, it may be desirable to minimize the number of added bits so that as few qubits as possible is required.

When interactions greater than second order are required, such as when LP(F) has no feasible solution, one approach is to explicitly simulate the required higher order interactions. If LP(F) is infeasible with all equality constraints, i.e., all $\alpha_b=0$ for $b \in \overline{B}$, then relaxing as many constraints are needed (i.e., remove them from LP(F)) in order to obtain a feasible solution may be done. Equality constraints of the Walsh coefficients that are removed, the multilinear function represented by the Walsh coefficient can be explicitly modeled. This can be done by using ancillary qubits to hold the product of two qubits in the interaction as described in Removing 2-Local Restrictions.

A problem arises in determining the minimum number of constraints that have to be removed from the infeasible LP(F) such that a solution can be found. This problem has been studied, and is referred to as the Irreducible Infeasible Subset (IIS) problem. The IIS problem is to find the smallest subset of constraints from an infeasible LP such that the subset is still an infeasible LP but removing any one constraint from the subset forms a feasible LP. This is akin to focusing on the constraints that are forming the inconsistency of the LP. With the IIS a user can pick a constraint from the subset to remove from the original LP such that the inconsistency in the original LP is removed. Several very efficient heuristic algorithms exist for finding the IIS such as is discussed in Chinneck, J. W., "Finding a Useful Subset of Constraints for Analysis in an Infeasible Linear Program", INFORMS Journal on Computing, 9:2, pp. 164-174, 1997.

Further optimizations which minimize the need for ancillary variables are possible. In representing the higher order interactions of the relaxed constraints, ancillary variables may be shared. For example, a constraint involving $x_1 x_2 x_3 x_4$ may be relaxed and ancillary variables $y_{1,2}$ and $y_{3,4}$ representing the products $x_1 x_2$ and $x_3 x_4$ respectively may be defined. Here, relaxing constraints that involve at least one of $x_1 x_2$ and $x_3 x_4$ is less costly, in terms of new variables, than constraints which involved other variables. Considerations like these can be utilized when selecting the ordering of constraints to be relaxed.

Figure 5:
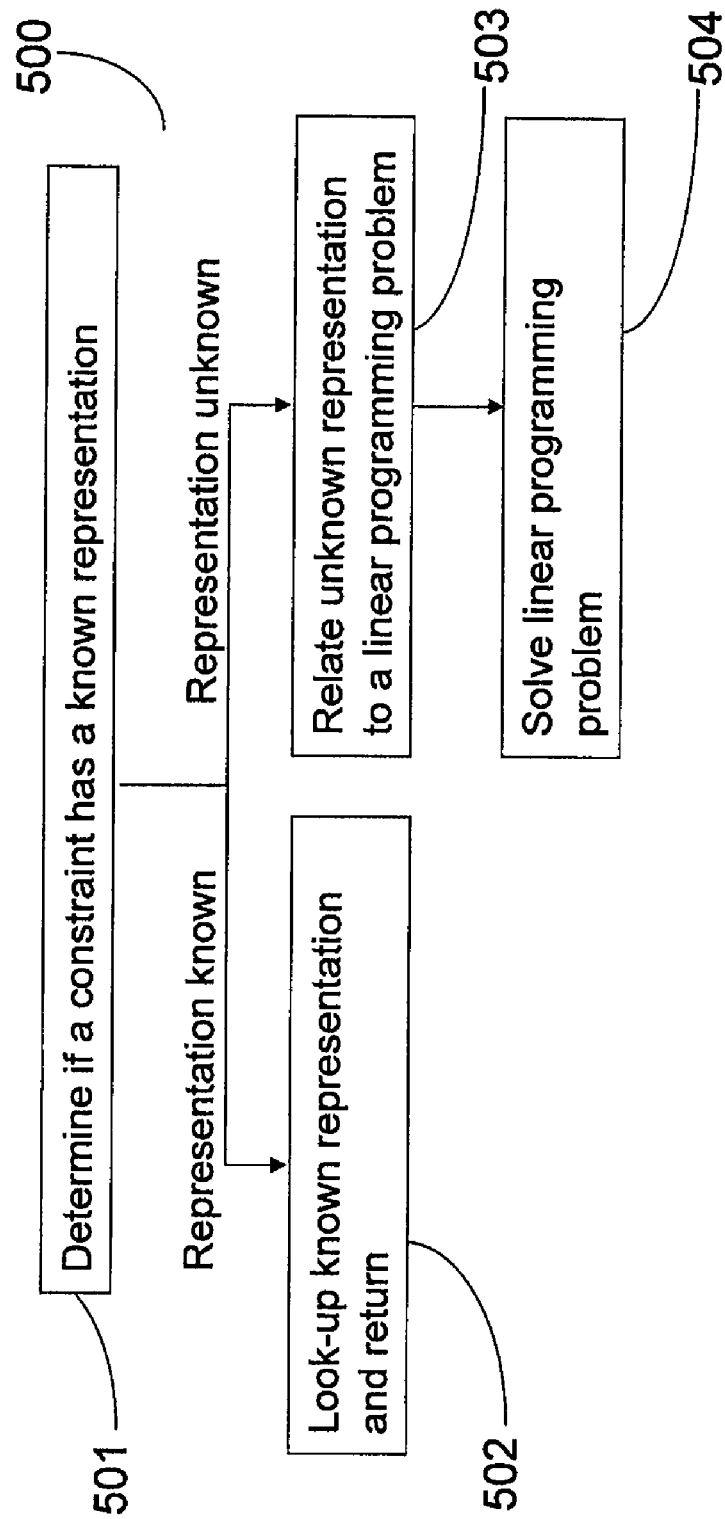
FIG. 5 is a flow diagram illustrating one aspect of a method of solving integer programming and discrete optimization.

One procedure 500 which derives specialized, or non-linear, constraints is summarized in FIG. 5. Here a specialized constraint is generated and a parameterized descriptions $Q_{pen}$ and $r_{pen}$ describing the quadratic constraint is returned. The quadratic penalty function $H(x)=x^T Q_{pen} x + r_{pen}^T x$ can be created. First a determination of whether or not a constraint has a known quadratic penalty representation is made in 501. If a constraint has a known quadratic penalty representation, this result is looked up and returned in 502. However, if a constraints representation is unknown, the construction of a quadratic penalty function begins by first casting the constraint as a linear programming problem in 503 and then attempting to solve the linear programming problem in 504. If this linear program is feasible, the solution is constructed which utilizes Eq. (6) to build the penalty function. However, if the linear programming problem is not feasible, ancillary qubits may be introduced. Irreducible infeasible set software may be utilized to determine a small set of constraints to relax and returns the non-zero multilinear coefficients in α. These coefficients are then converted into a quadratic form using the procedures of 202 and 203 of FIGS. 2A-2C.

Problem Decomposition

QC hardware systems can be used to solve problems having far more variables that the number of qubits available in the physical realization.

Described herein are two methods for solving this problem, though those of ordinary skill in the art would appreciate that many other hybrid methods are also possible. The methods described are based on a graphical simplification of the general n-variable problem: $x^T Q x + r^T x$ where each $x_i$ is either 0 or 1. Previous steps show how any discrete optimization problem (constrained or unconstrained) may be brought to this canonical form. From Q one can define a graph $G=(V, E)$ of n nodes. The nodes represent variables and edges between nodes represent non-zero (either positive or negative) interactions between variables. This graph is called the factor graph of the problem.

Fixing any optimization variable to a particular value, whereby the value is treated such that it no longer will be optimized, eliminates its corresponding nodes in the factor graph. Consider a node $x_i$ and an edge from i corresponding to the non-zero interaction $Q_{i,j} x_i x_j$. If $x_i$ is considered fixed the term $Q_{i,j} x_i x_j$ simply contributes an additional constant $Q_{i,j} x_i$ to the linear constant for node $x_j$. Thus, this additional contribution is added to the existing contribution $r_j x_j$ for node $x_j$. This results in a new effective linear term $\tilde{r}_j x_j$ for $x_j$ is $\tilde{r}_j = r_j + Q_{i,j} x_i$. This may be applied to all neighbors of $x_i$ so that node $x_i$ and all edges emanating from $x_i$ can be removed from the graph. The cost of this reduction is that both possible values for $x_i$ are tested. By repeatedly applying this node elimination procedure to enough nodes one may reduce the problem to one that can be accommodated in physical embodiments of QC that could not otherwise efficiently solve the problem.

Cutset Conditioning

Let x denote the set of optimization variables and let $E(x) = x^T Q x + r^T x$. The variables x are divided into two disjoint groups: c and f. The variables in c are forced to take on ("clamped to") particular values (the values which will later be optimized over) and the variables in f are optimized by the QC hardware system. Mathematically, this is shown as:

$$\min_x E(x) = \min_c \min_f E(c, f).$$

The c variables are chosen so that for a given fixed setting of those variables, the energy function breaks up into separate pieces sharing no common f values. Graphically, the factor graph falls apart into disconnected components once the c nodes are removed. In this case the energy can be written as $$E(c, f) = \sum_\alpha E_\alpha(c, f_\alpha)$$

where $f_\alpha$ are the "free" (i.e., non-clamped) variables in subproblem α. Since the subproblems are independent when conditioned on c it can be shown that:

$$\min_x E(x) = \min_c \min_f \sum_\alpha E(c, f_\alpha) = \min_c \sum_\alpha \min_{f_\alpha} E(c, f_\alpha) = \min_c \sum_\alpha E_\alpha(c),$$

where $E_\alpha(c) = E_\alpha(c, f_\alpha^*(c))$ and $f_\alpha^*(c)$ is the setting of $f_\alpha$ which minimizes $E(c, f)$ for a given setting of c. The minimization problem over c is known as the meta-optimization problem since determining the objective for each value of c requires an inner optimization. The minimization with respect to each $f_\alpha$ is carried out on the QC hardware system. The remaining minimization over c can be carried out using any classical minimization technique (e.g., simulated annealing, hill-descending, etc.). This minimization may rely on a complete algorithm (obtaining the global minimum), or, in other embodiments, rely on heuristics which approximate the global minimum. In either case, the values of $f_\alpha^*(c)$ may be cached so that recomputation is not done.

Selection of Clamped Variables

With this approach, sufficient clamped values are chosen such that all the $E_\alpha$ problems are small enough to fit into a particular QC hardware system. The number of clamps may be minimized so that the meta-optimization over c is as small and less complex. As framed, determining a minimal set of c is a graph theoretical problem and can be determined from the factor graph of the optimization problem. The set of clamped nodes c is a vertex separator for the graph of any pair of nodes selected from different subproblems. A related graph theoretic problem is graph partitioning which divides the nodes of the graph into disjoint subsets while minimizing the edge connections between nodes in different subsets. Algorithms finding vertex separators and graph partitionings may be used to find good (i.e., small enough to fit on a particular QC hardware system) choices of nodes c.

Large Neighborhood Local Search

Large neighborhood local search (LNLS) differs from cutset conditioning in that the clamped variables (nodes) in the LNLS factor graph vary over time. Further, as the name indicates LNLS is a version of local search and as such cannot guarantee identification of the global minimum unless the neighborhood is sufficiently large.

LNLS works as follows. An initial guess is assigned for the optimization variables x. Then a random set of variables is chosen and thereby this set of variables defines the neighborhood to be searched over by the QC hardware system. This set of neighbors is optimized over, assuming the fixed values assigned initially for all other variables. The number of variables in the neighborhood is set by the size of the largest possible realization of a particular QC hardware system. At this first iteration the neighborhood is indicated by $f^{(1)}$ and the set of remaining clamped values by $c^{(1)}$. The QC hardware system minimizes to find the best value for $f^{(1)}$, i.e., $$f^{(1),*} = \underset{f^{(1)}}{\mathrm{argmin}} E(c^{(1)}, f^{(1)}).$$

Having determined this value, consider $x=[c^{(1)}, f^{(1),*}]$ as the next starting point and iterate. A new neighborhood $f^{(2)}$ is chosen which may, for example, be via selection of a new random set of variables or a deterministic procedure, and then is optimized again for the optimal settings of the variables in the neighborhood. Those of ordinary skill in the art will appreciate that the new neighborhood may or may not share variables in common with previous neighborhoods. Once the optimal settings are determined for $f^{(2)}$, this may be set as the new starting point, and the iterations continued as above.

As an example, if the optimization problem consists of n variables and the neighborhood consists of m variables, then the neighborhoods may be all possible $$\binom{n}{m}$$

subsets of size m. This assumes that the particular physical QC hardware system can solve m variable problems where m<n. At each iteration one of these neighborhoods is selected at random and optimized. Once this procedure has reached a local minimum in E(x) with respect to all m-variable alterations, no further progress can be made. Thus, this method need not return globally optimal results.

Hybrid Methods

Variants of the above Cutset Conditioning and Large Neighborhood Local Search methods are possible and may often be desirable. Some parts of the factor graph may be treated with cutsets conditioning, while others, e.g., cliques may be treated with LNLS.

Min-Propagation

Note that other methods of decomposition are possible. For example, as shown in Aji, et al., "The generalized distributive law," *IEEE Trans. On Information Theory*, 46:325-343, March 2000, if the factor graph of the meta-optimization problem has a small tree-width then methods like minimum-sum belief propagation are applicable. Min propagation looks not to be applicable as the data processed in the algorithm are tables of objective values. However, as was seen, even tabular representations of objective functions may be processed and optimized on QC hardware system by utilizing method 200 of FIG. 2.

Solving Discrete Optimization Problems on QC Hardware

Figure 6:
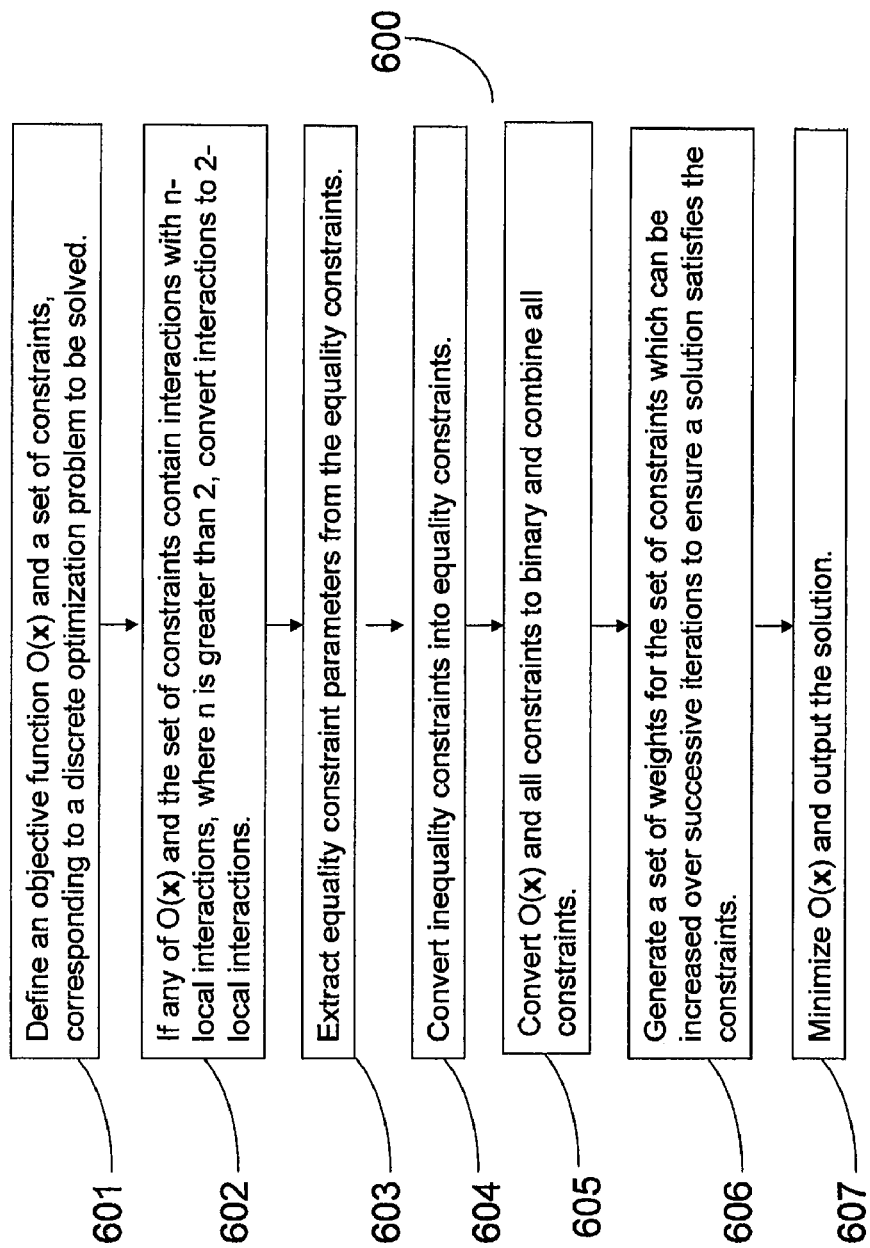
FIG. 6 is a flow diagram illustrating one aspect of a method of solving integer programming and discrete optimization.

The system components discussed above may be combined to solve a discrete (constrained) optimization problem on a particular QC hardware system that has one or more physical limitations. It is assumed that there are n optimization variables with variable i having domain [0, $D_i$-1]. The general approach is described in method 600 of FIG. 6.

Method 600 begins with receiving an objective function and a set of constraints corresponding to an integer programming or discrete optimization problem in 601. In 602, the objective function is turned into a quadratic 2-local objective function Q, r through method 200 of FIG. 2. The equality constraints are converted into an appropriate format in 603. Method 100 of FIG. 1 is utilized in 604 to convert an objective and constraints which may include non-binary optimization variables to a binary optimization problem. In 604, if there are any inequality constraints (either because such constraints were posed or because they were generated in the conversion to a binary problem) these are converted to equality constraints through the introduction of binary slack variables through the procedure 500 of FIG. 5. At this point 606 generates positive parameters, λ, that weight each of the penalty terms. The problem is then sent to the quantum computer in 607 where the objective function is minimized and from which the solution is output.

Having done the necessary preprocessing, the method loops, increasing the penalty weights at each iteration, until a feasible solution is found or an exit criteria, such as completing a specified number of iterations or the change in the objective function after each iteration is smaller than a predetermined value, is satisfied. At each iteration a quadratic energy function is formed from the objective function and the penalty term from the constraints. Next a meta-optimization procedure such as cutset conditioning or LNLS, named metaAlg, is selected and decomposes the given problem into smaller subproblems that can be solved on the QC hardware system. The meta-optimization procedure returns an approximate minimum of the energy function. Finally, the answer is returned, and the constraints and the penalties are updated. This basic iteration may be run through many times until the constraints are satisfied or until some predefined exit condition is met.

Figure 7:
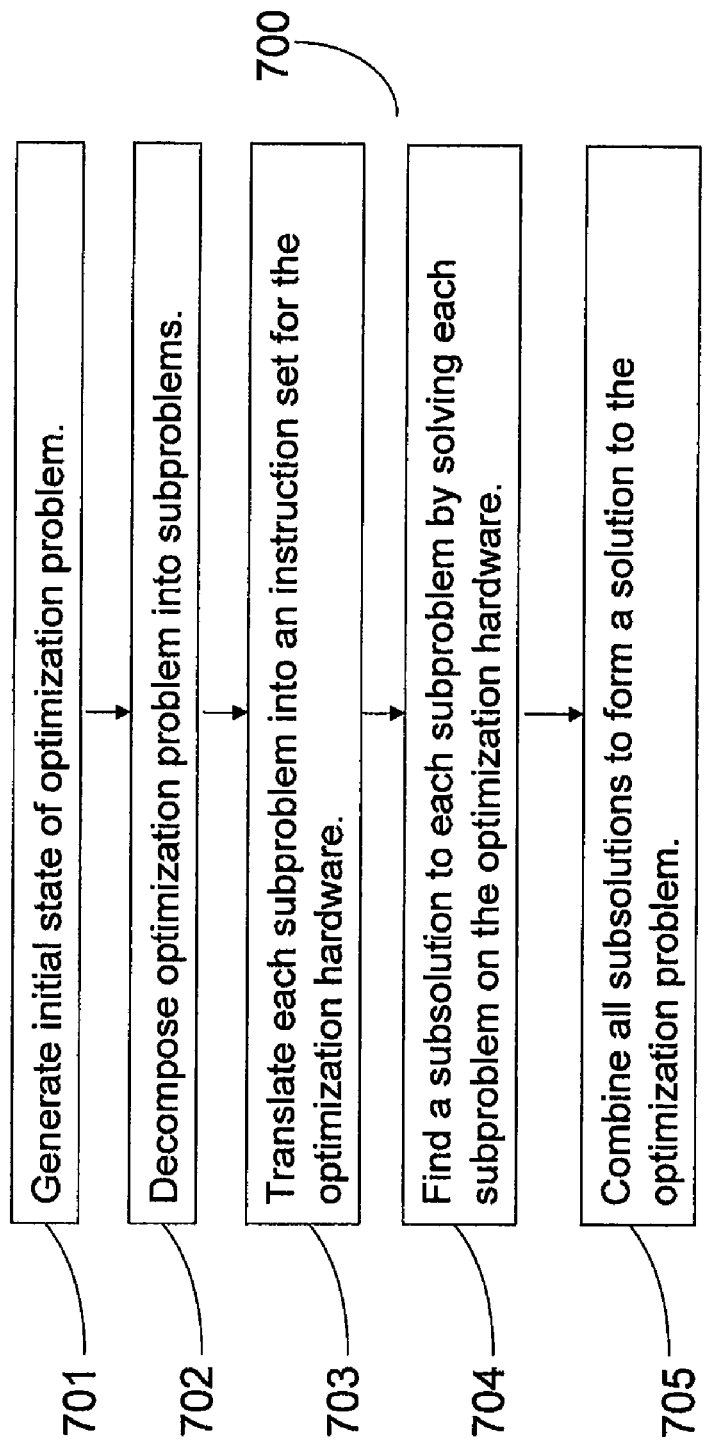
FIG. 7 is a flow diagram illustrating one aspect of a method of solving integer programming and discrete optimization.

In the above steps the QC hardware system enters in the meta-optimization procedure. FIG. 7 outlines one embodiment of a method of performing this meta-optimization. In some embodiments, the meta-optimization procedure relies on the QC hardware system to solve the subproblems that it generates. The basic framework outlined in the method 700 of FIG. 7 is sufficiently flexible to allow for different types of meta-optimization procedures, like cutset conditioning, large neighborhood local search, or min-propagation. To begin, in 701 the initial state is generated. This generation may include the creation of the set of clamped variables in cutset conditioning, or the initialization of the state of all variables in large neighborhood local search. Loop over a set of basic steps. Through each iteration, a problem too large to be embedded into a particular QC hardware system may be decomposed into a set of subproblems in 702, wherein each subproblem is of small enough size to be solved by the particular QC hardware system. This decomposition may depend on the global state so that the decomposition varies over time. In 703, these subproblems are translated to a form in which they can be solved by the particular QC hardware system. This translation may involve both an embedding and other specific details which are described below in Implementation on Transverse Ising Hamiltonian. Each subproblem is solved in 704. Solutions to all subproblems are obtained. The results are combined to form a solution in 705. Finally, if the solution produced in 705 satisfies the original optimization problem received in 701, the method 700 ends. However, if the solution in 705 does not satisfactorily satisfy the optimization problem received in 701, one may return to act 702 to decompose the problem again, using the results of act 705. This process may be completed until an exit criteria, such as a predetermined number of iterations or a predetermined minimally allowable difference between two solutions produced in two successive iterations, is met.

Implementation on Transverse Ising Hamiltonian

In the previous section described general procedures for solving discrete optimization problems on an Adiabatic Quantum Computer (AQC) hardware. In this section, a particular implementation of AQC hardware based on the transverse Ising Hamiltonian will be used to illustrate the procedures described in Solving Discrete Optimization Problems on QC Hardware.

The transverse Ising model is governed by the Hamiltonian $$H = \sum_{(i,j) \in E} J_i \sigma_i^z \sigma_j^z + \sum_{i \in V} h_i \sigma_i^z + \sum_{i \in V} h_i^\perp \sigma_i^x \quad (8)$$

where V is a set of n qubits (nodes) and i is a particular qubit, E is a set of edges connecting qubits and (i,j) is a particular edge connecting qubits i and j. $J_{i,j}$, $h_i$, and $h_i^\perp$ are tunable parameters set to solve a discrete optimization problem.

In Equation (8) $\sigma_i^z$ and $\sigma_i^x$ are Pauli matrices acting on qubit i given by $$\sigma^z = \begin{bmatrix} 1 & 0 \\ 0 & -1 \end{bmatrix}$$

$$\sigma^x = \begin{bmatrix} 0 & 1 \\ 1 & 0 \end{bmatrix}.$$

The summation in the definition of H over such Pauli matrices is shorthand such that a term like $\sigma_i^z \sigma_j^z$ is:

$$\sigma_i^z \sigma_j^z = I_1 \otimes \ldots \otimes I_{i-1} \otimes \sigma_i^z \otimes I_{i+1} \otimes \ldots \otimes I_{j-1} \otimes \sigma_j^z \otimes I_{j+1} \otimes \ldots \otimes I_n,$$

and $\sigma_i^z$ (similarly for $\sigma_i^x$) is:

$$\sigma_i^z = I_1 \otimes \ldots \otimes I_{i-1} \otimes \sigma_i^z \otimes I_{i+1} \otimes \ldots \otimes I_n.$$

A graph G=(V, E) defining connections between vertices is arbitrary but assumed to be specified. In the realization described herein, the graph is an extended two-dimensional grid.

The graph embedding step described in Removing Local Restrictions enables the mapping of any problem to an extended grid graph G. Moreover, in this AQC hardware the natural physical variables are binary (−1, +1), not Boolean (0, 1), so the Boolean values are translated to binary values of {−1, +1} used in $\sigma_i^z$ of the AQC hardware. Since the z Pauli matrix $\sigma_i^z$ is diagonal, the only off-diagonal part of H arises from the transverse field contribution coming from $h_i^\perp$. Thus, $$H = diag(E(\sigma_1^z, \ldots, \sigma_n^z)) + \sum_{i \in V} h_i^\perp \sigma_i^x,$$

where $diag(E(\sigma_1^z, \ldots, \sigma_n^z))$ is a diagonal matrix having the form $$\begin{bmatrix} E(-1, \ldots, -1) & 0 & \cdots & 0 \\ 0 & E(-1, \ldots, 1) & \cdots & 0 \\ \vdots & \vdots & \ddots & \vdots \\ 0 & 0 & \cdots & E(1, \ldots, 1) \end{bmatrix}.$$

To completely specify the realization of the objective $E(x) = x^T Q x + r^T x$, E(x) is related to $E(\sigma^z)$, where $\sigma^z = [(\sigma_1^z, \ldots, \sigma_n^z)]$. Since $\sigma_i^z = 2x_i − 1$ maps $x_i = 0$ to $\sigma_i^z = −1$ and $x_i = 1$ to $\sigma_i^z = 1$ and defining 1 to be a vector of length n all of whose components are 1:

$$\sigma^z = 2x - 1 \text{ and } x = \tfrac{1}{2}(1 + \sigma^z).$$

Thus $E(x) = x^T Q x + r^T x$ becomes in the $\sigma^z$ variables:

$$E(\sigma^z) = \tfrac{1}{4}(1 + \sigma^z)^T Q(1 + \sigma^z) + \tfrac{1}{2} r^T (1 + \sigma^z)$$

$$E(\sigma^z) = (\sigma^z)^T \tfrac{Q}{4} \sigma^z + \left(\tfrac{r}{2} + \tfrac{Q1}{2}\right)^T \sigma^z + \tfrac{1}{4} 1^T Q 1 + \tfrac{1}{2} r^T 1.$$

The last two terms above are independent of the optimization variables $\sigma^z$ and can therefore be ignored. By examining the quadratic and linear terms respectively, it can be seen that:

$$J_{i,j} = \frac{Q}{4}$$

and $$h_i = \frac{r_i}{2} + \frac{1}{2} \sum_{j=1}^{n} Q_{ij}.$$

Thus, the $J_{i,j}$ and $h_i$ parameters are related to the problem parameters Q and r.

Quantum Annealing

The parameters $h_i^\perp$, describing the transverse field, are the terms that bring in the quantum mechanics and allows for speedups over classical optimization (classical annealing) of the same objective.

Numerous references, as described in the section title Adiabatic Quantum Computing, have described how the J and h parameters should be adjusted over time (see also Farhi, et al., "Quantum adiabatic evolution algorithms with different paths," arXiv.org:quant-ph/0208135, 2002). Their initial nonzero value, and at the termination of the computation all $h_i^1$ are near zero which corresponds to the lowest energy state of $E(\sigma^2)$ or equivalently $E(x)$.

The particular annealing schedule chosen for any class of problems determines the procedure ANNEALTRANSVERSEISING(J, h, E).

System for Graph Embedding

Figure 8:
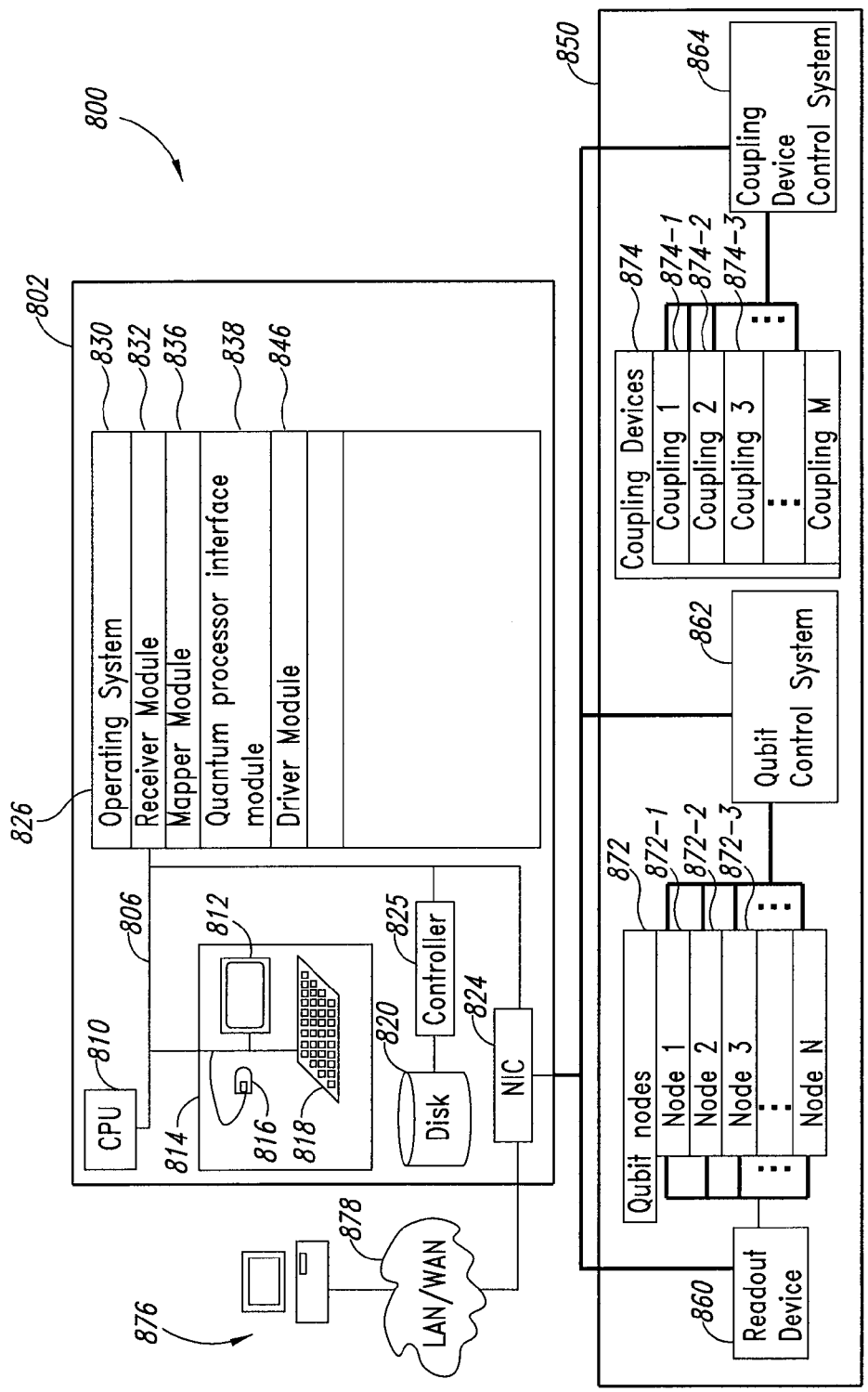
FIG. 8 is a block diagram of an embodiment of a computing system.

FIG. 8 illustrates an example system 800 for use in performing integer programming and/or discrete optimization according to the present systems, methods and apparatus. The integer programming and/or discrete optimization may be part of a process by system 800 to solve computational problems. Example system 500 includes a conventional computer 802 that comprises:

- at least one CPU 810;
- a main non-volatile storage unit 820 controlled by a controller 825;
- a system memory 826, such as high speed random-access memory (RAM), for storing system control programs such as an operating system 830 and data and application programs loaded from main non-volatile storage unit 820; system memory 826 may also include read-only memory (ROM);
- a user interface 814, which may include input devices such as mouse 816 and/or keyboard 818, and display 812, and/or other peripheral devices;
- a network interface card (NIC) 824 or other communication circuitry; and
- an internal bus 806 for interconnecting the aforementioned elements of system 800.

System 800 further includes a quantum processor 850. Quantum processor 850 includes multiple qubit nodes 872 and multiple coupling devices 874. Qubit nodes 872 may comprise e.g., superconducting qubits, and may be arranged in a two-dimensional lattice, where at least some of the qubits can be coupled to their nearest neighbors, their next-nearest neighbors, or both their nearest and next-nearest neighbors via coupling devices 874. In addition, there may be more than one quantum processor 850 in communication with conventional computer 802.

Quantum processor 850 includes a readout device 860. Readout device 860 may include multiple dc-SQUID magnetometers, with each dc-SQUID magnetometer being inductively connected to a qubit node 872 and NIC 824 receiving a voltage or current from readout device 860. The dc-SQUID magnetometers comprise a loop of superconducting material interrupted by two Josephson junctions and are well known in the art.

Quantum processor 850 also includes a coupling device control system 864 including coupling controller(s) for coupling devices 874. Each coupling controller in coupling device control system 864 is capable of tuning the coupling strength of a coupling device 874 from zero to its maximum value. Coupling devices 874 may be tuned to provide ferromagnetic or anti-ferromagnetic coupling between qubit nodes 872. Quantum processor 850 further includes a qubit control system 862 including controller(s) for qubit nodes 872.

A number of program modules and data structures may be stored and processed by system 800. Typically, some or all of the data structures and program modules are stored in system memory 826 and for ease of presenting the various features and advantages of the present devices and methods, such data structures and program modules are drawn as components of system memory 826. However, it will be appreciated that at any given time, the program modules and data structures illustrated in system memory 826 may be stored in main non-volatile storage unit 820. Furthermore, some or all of the data structures and program modules may be stored on a remote computer not illustrated in FIG. 8, provided that the remote computer is addressable by computer 802, i.e., there is some communication means between the remote computer and computer 802 such that data can be exchanged between the two computers over a data network (e.g., the Internet, a serial connection, a parallel connection, Ethernet, etc.) using a communication protocol (e.g., FTP, telnet, SSH, IP, etc.).

Operating system 830 may be configured to handle various system services, such as file services, and for performing hardware dependent tasks. Many operating systems that can serve as operating system 830 are known in the art including, but not limited to UNIX, Windows NT, Windows XP, DOS, LINUX, and VMX. Alternatively, there may be no operating system present and instructions may be executed in a daisy chain manner.

Receiver module 832 serves to receive information for system 800. The information received may be a representation of a constrained or unconstrained discrete optimization problem including integer programming to be embedded onto quantum processor 850, or may simply be a computational problem to be solved by system 800, with the intention that the computational problem will be converted by system 800 into a graph that can be embedded onto quantum processor 850. A remote computing system 876 may provide the representation of the computational problem to the receiver module 832, via a communications channel 878, for example, via a local area network (LAN) and/or wide area network (WAN), such as the Internet. Receiver module 832 may also send information from system 800, such as, for example, a problem or a graph generated by system 800, where the problem or graph is already present in system memory 826 or is received by receiver module 832 from a remote computing system 876. The receiver module 832 may provide results of the problem solution, and/or other information to the remote computing system 876, for example via the communications channel 878. Exemplary communications channels 878 for receiving and/or sending this information include, but are not limited to, a telephone modem, a wireless modem, a local area network connection, a wide area network connection, or a portable data device. The information sent or received by receiver module 832 may be encrypted.

Mapper module 836 may be configured to embed the representation of the problem onto quantum processor 850. A variety of embedding techniques that may be used. Mapper module 836 may be configured to employ more than one technique and to select the most efficient for actual embedding onto quantum processor 850. Mapper module may also be configured to convert a computational problem received by receiver module 832, such as Maximum Independent Set, Max Clique, Max Cut, TSP problem, k-SAT, integer linear programming, or Ising Spin Glass, into a graph before commencing the embedding process. Mapper module 836 may also include a graphical user interface capable of displaying the graph and any intermediate acts or final results of the embedding of the representation of the problem or graph. Intermediate acts may be displayed, such as the assignment of vertices and edges, the pre-optimized embedding, and optimization steps done on the embedding. Final results may include one or more optimized embeddings constructed by mapper module 836.

Quantum processor interface module 838 is used to coordinate the solution of computational problems using quantum processor 850. For example, quantum processor interface module 838 may initiate quantum processor 850 into the graph embedding derived by mapper module 836. This may include, e.g., setting initial coupling values and local bias values for coupling devices 574 and qubit nodes 872 respectively. Qubit nodes 872 and associated local bias values may represent vertices of the embedded representation of the problem or graph, and coupling values for coupling devices 874 may represent edges. For example, a vertex in a graph may be embedded onto quantum processor 850 as a set of qubit nodes 872 coupled to each other ferromagnetically and coupling interactions may be embedded as a ferromagnetic or anti-ferromagnetic coupling between sets of coupled qubit nodes 872.

To solve the computational problem using quantum processor 850, an adiabatic evolution or an annealing evolution may be used, and quantum processor interface module 838 may include run-time instructions for performing the evolution. For more information, see for example US 2005-0256007, US 2005-0250651 and U.S. Pat. No. 7,135,701 each titled "Adiabatic Quantum Computation with Superconducting Qubits". Quantum processor interface module 838 may also include instructions for reading out the states of one or more qubit nodes 872 at the end of an evolution. This readout may represent a solution to the computational problem.

System memory 826 may further include a driver module 546 for outputting signals to quantum processor 850. NIC 824 may include appropriate hardware required for interfacing with qubit nodes 872 and coupling devices 874, either directly or through readout device 860, qubit control system 862, and/or coupling device control system 864. Alternatively, NIC 824 may include software and/or hardware that translate commands from driver module 846 into signals (e.g., voltages, currents, optical signals, etc.) that are directly applied to qubit nodes 872 and coupling devices 874. In another alternative, NIC 824 may include software and/or hardware that translates signals (representing a solution to a problem or some other form of feedback) from qubit nodes 872 and coupling devices 874. In some cases, quantum processor interface module 838 may communicate with driver module 846 rather than directly with NIC 824 in order to send and receive signals from quantum processor 850.

The functionality of NIC 824 can be divided into two classes of functionality: data acquisition and control. Different types of chips may be used to handle each of these discrete functional classes. Data acquisition is used to measure the physical properties of qubit nodes 872 after quantum processor 850 has completed a computation. Such data can be measured using any number of customized or commercially available data acquisition micro-controllers including, but not limited to, data acquisition cards manufactured by Elan Digital Systems (Fareham, UK) including the AD132, AD136, MF232, MF236, AD142, AD218 and CF241 cards. Alternatively, data acquisition and control may be handled by a single type of microprocessor, such as the Elan D403C or D480C. There may be multiple NICs 824 in order to provide sufficient control over qubit nodes 872 and coupling devices 874 and in order to measure the results of a quantum computation on quantum processor 850.

Computer 802 may also comprise means for receiving a computational problem and transmitting the solution to a computational problem produced by quantum processor 850 to another system, such as a telephone modem, a wireless modem, a local area network connection, a wide area network connection or a portable data device. Computer 802 may generate a carrier wave embodying a data signal, with the solution to the computational problem produced by quantum processor 850 embedded therein.

Quantum processor 850 may be a superconducting quantum computer, examples of which include qubit registers, readout devices and ancillary devices. Superconducting quantum computers normally are operated at millikelvin temperatures and often are operated in a dilution refrigerator. An example of a dilution refrigerator is the Leiden Cryogenics B.V. MNK 126 series (Galgewater No. 21, 2311 VZ Leiden, The Netherlands). All or part of the components of quantum processor 850 may be housed in the dilution refrigerator. For example, qubit control system 862 and coupling device control system 864 may be housed outside the dilution refrigerator with the remaining components of quantum processor 850 being housed inside the dilution refrigerator.

Receiver module 832, quantum processor interface module 838 and driver module 846, or any combination thereof, may be implemented in existing software packages. Suitable software packages include, but are not limited to, MATLAB (The MathWorks, Natick, Mass.) and LabVIEW (National Instruments, Austin, Tex.).

The present methods, systems and apparatus also may be implemented as a computer program product that comprises a computer program mechanism embedded in a computer readable storage medium. For instance, the computer program product could contain the program modules shown in FIG. 8. These program modules may be stored on CD-ROM, DVD, magnetic disk storage product, or any other computer readable data or program storage product. The software modules in the computer program product may also be distributed electronically, via the Internet or otherwise, by transmission of a data signal (in which the software modules are embedded) embodied in a carrier wave.

All of the U.S. patents, U.S. patent application publications, U.S. patent applications, foreign patents, foreign patent applications and non-patent publications referred to in this specification including, but not limited to, U.S. Pat. No. 6,838,694; U.S. 2005-0162302; U.S. Pat. No. 7,230,266; U.S. 2005-0082519; U.S. 2005-0256007; U.S. 2005-0250651; U.S. Pat. No. 7,135,701; U.S. 2005-0273306; U.S. Pat. No. 7,253,654; U.S. 2006-0097747; U.S. 2006-0147154; and U.S. 2006-0248618 are incorporated herein by reference, in their entirety.

As will be apparent to those skilled in the art, the various embodiments described above can be combined to provide further embodiments. Aspects of the present systems, methods and apparatus can be modified, if necessary, to employ systems, methods, apparatus and concepts of the various patents, applications and publications to provide yet further embodiments of the invention.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Further, in the methods taught herein, the various acts may be performed in a different order that that illustrated and described. Additionally, the methods can omit some acts, and/or employ additional acts.

These and other changes can be made to the present systems, methods and apparatus in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

I claim:

1. A method of solving a discrete optimization problem using a quantum computer, the method comprising:
   receiving an objective function and at least one constraint corresponding to the discrete optimization problem;
   converting the objective function into a first set of inputs for the quantum computer;
   converting the at least one constraint into a second set of inputs for the quantum computer;
   categorizing the constraints as either linear constraints or non-linear constraints, and wherein there are at least two constraints and the second set of inputs is comprised of a first subset of linear constraint inputs and a second subset of non-linear constraint inputs;
   generating a third set of inputs wherein the thirds set of inputs is at least indicative of at least one penalty coefficient;
   processing the first set of inputs, the second set of inputs and the third set of inputs with the quantum computer; and
   reading out a final state of the quantum computer wherein at least a portion of a solution to the discrete optimization problem corresponds to the final state of the quantum computer.

2. The method of claim 1 wherein the non-linear constraint has a predetermined penalty representation corresponding to a known set of inputs for the quantum computer.

3. The method of claim 1 wherein converting the at least one constraint includes converting at least one n-local interaction into a plurality of 2-local interactions, wherein n is greater than 2.

4. The method of claim 1, further comprising:
   converting at least one of the first set of inputs, the second set of inputs and the third set of inputs into binary values.

5. The method of claim 1, further comprising:
   generating a fourth set of inputs for the quantum computer wherein the fourth set of inputs is an increasing of the value of at least one of the at least one penalty coefficient;
   processing the first set of inputs, the second set of inputs and the fourth set of inputs on the quantum computer; and
   reading out a second final state of the quantum computer.

6. The method of claim 1 wherein processing the first set of inputs, the second set of inputs and the third set of inputs on the quantum computer comprises:
   combining the first set of inputs, the second set of inputs and the third set of inputs into an energy function to be minimized by the quantum computer.

7. The method of claim 6, further comprising:
   performing a meta-optimization procedure on the energy function to decompose the energy function into a plurality of energy subfunctions.

8. The method of claim 1 wherein the quantum computer includes at least one of an analog optimization device and an adiabatic quantum computer.

9. The method of claim 1 wherein the discrete optimization problem is an integer programming problem.

10. A method of solving a discrete optimization problem, the method comprising:
    receiving an objective function and at least one constraint corresponding to the discrete optimization problem on a digital computer;
    converting the objective function into a first set of inputs for a quantum computer;
    converting the at least one constraint into a second set of inputs for the quantum computer;
    generating a third set of inputs for the quantum computer wherein the third set of inputs is indicative of at least one penalty coefficient;
    sending the first set of inputs, the second set of inputs and the third set of inputs to the quantum computer;
    generating an initial Hamiltonian;
    embedding the initial Hamiltonian onto the quantum computer;
    evolving the quantum computer from the initial Hamiltonian to a final Hamiltonian wherein the final Hamiltonian corresponds to combining at least in part the first set of inputs, the second set of inputs and the third set of inputs;
    performing a meta-optimization procedure on the final Hamiltonian to decompose the final Hamiltonian into a plurality of energy functions wherein each energy function is minimizable on the quantum computer;
    reading out a final state of the final Hamiltonian wherein the final state of the quantum computer corresponds to at least a portion of a solution to the discrete optimization; and
    returning at least a portion of the solution to the digital computer.

11. The method of claim 10 wherein at least one constraint is an inequality constraint, the method further comprising:
    converting the inequality constraint into an equality constraint.

12. The method of claim 10 wherein converting the objective function includes converting at least one n-local interaction into a plurality of 2-local interactions, wherein n is greater than 2.

13. The method of claim 10 wherein sending the first set of inputs, the second set of inputs and the third set of inputs to the quantum processor occurs in a plurality of acts and wherein each act includes sending at least a portion of the first set of inputs, at least a portion of the second set of inputs and at least a portion of the third set of inputs to the quantum computer.

14. The method of claim 10 wherein the second set of inputs penalize each final state of the quantum computer that violates one of the constraints.

15. The method of claim 10 wherein the first set of inputs causes the final state of the quantum computer to be a minimum of the objective function.

16. The method of claim 15 wherein the minimum of the objective function is either a local minimum or a global minimum.

17. The method of claim 10, further comprising:
generating a fourth set of inputs for the quantum computer wherein the fourth set of inputs is an increase of the value of at least one of the at least one penalty coefficient;
generating a second initial Hamiltonian;
embedding the second initial Hamiltonian onto the quantum computer;
evolving the quantum computer from the second initial Hamiltonian to a second final Hamiltonian wherein the second final Hamiltonian corresponds to combining at least in part the first set of inputs, the second set of inputs and the fourth set of inputs; and
reading out a second final state of the second final Hamiltonian.

18. The method of claim 10 wherein performing a meta-optimization procedure comprises at least one of cutset conditioning, large neighborhood local searching and min-propagation.

19. The method of claim 10 wherein the quantum computer includes at least one of an analog optimization device and an adiabatic quantum computer.

* * * * *